(12) United States Patent
Kimura et al.

(10) Patent No.: US 7,024,286 B2
(45) Date of Patent: Apr. 4, 2006

(54) PARKING ASSISTING DEVICE

(75) Inventors: Tomio Kimura, Aichi-ken (JP); Kazunori Shimazaki, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 56 days.

(21) Appl. No.: 10/797,334

(22) Filed: Mar. 9, 2004

(65) Prior Publication Data

US 2004/0204807 A1    Oct. 14, 2004

(30) Foreign Application Priority Data

Apr. 14, 2003    (JP)    ............................. 2003-108956

(51) Int. Cl.
*G06F 17/00* (2006.01)
*B60Q 1/48* (2006.01)

(52) U.S. Cl. .............................. 701/1; 701/36; 348/119

(58) Field of Classification Search .................... 701/1, 701/36, 301, 300, 28; 340/932.2, 436, 435; 348/118, 119
See application file for complete search history.

(56) References Cited

U.S. PATENT DOCUMENTS

| | | | | |
|---|---|---|---|---|
| 6,487,481 B1* | 11/2002 | Tanaka et al. | ................ | 701/41 |
| 6,593,960 B1* | 7/2003 | Sugimoto et al. | ............ | 348/148 |
| 6,621,421 B1* | 9/2003 | Kuriya et al. | ............. | 340/932.2 |
| 6,654,670 B1* | 11/2003 | Kakinami et al. | ............. | 701/1 |
| 6,697,720 B1* | 2/2004 | Ikeda | ........................... | 701/36 |
| 6,704,653 B1* | 3/2004 | Kuriya et al. | ................ | 701/301 |
| 2002/0104700 A1* | 8/2002 | Shimazaki et al. | .......... | 180/204 |
| 2003/0080877 A1* | 5/2003 | Takagi et al. | ............ | 340/932.2 |

FOREIGN PATENT DOCUMENTS

| | | |
|---|---|---|
| EP | 0 835 796 A2 | 4/1998 |
| EP | 1 102 226 A2 | 5/2001 |
| EP | 1 123 844 A1 | 8/2001 |
| EP | 1 170 171 A2 | 1/2002 |
| EP | 1 253 065 A2 | 10/2002 |
| EP | 1 297 999 A2 | 4/2003 |
| JP | 2000-272445 | 10/2000 |
| JP | 2001-322520 | 11/2001 |
| JP | 2002-251632 | 9/2002 |

* cited by examiner

*Primary Examiner*—Michael J. Zanelli
(74) *Attorney, Agent, or Firm*—Morgan & Finnegan, LLP

(57) ABSTRACT

Disclosed is a parking assisting device, including: a camera for capturing an image behind a vehicle; a display provided to a dashboard of the vehicle; passage width measurement device that measures a width of a passage; and a controller for displaying the image captured with the camera on the display. Also disclosed is a device for calculating an initial stopping position required for parking the vehicle in-parallel into a target parking space perpendicular to the passage on the basis of the passage width measured, with the passage width measurement device, to superimpose on a screen of the display a displayed image for guidance used for guiding the vehicle to the initial stopping position.

18 Claims, 21 Drawing Sheets

PARKING ASSISTING DEVICE

BACKGROUND OF THE INVENTION

1. Field of the Invention

The present invention relates in general to a parking assisting device, and more particularly to a device for informing a driver of driving operations for in-parallel parking of a vehicle in a narrow passage.

2. Description of the Related Art

Conventionally, as described in JP 2002-251632 A for example, there has been developed an operation assisting device in which an image captured with a monitoring camera mounted to a vehicle is displayed on a display, and a predicted locus corresponding to a steering angle of a steering wheel of the vehicle is superimposed on the displayed image to thereby assist a driver with his/her driving operations.

With such an operation assisting device, the driver drives and operates a vehicle while looking at a predicted locus on a display, whereby he/she can park the vehicle in-parallel into a parking space, for example.

However, when parking a vehicle in a narrow passage, the driver needs to move it backward and forward so as not to interfere with the circumference. Thus, displaying only a predicted locus for driving a vehicle in reverse on a display is insufficient.

SUMMARY OF THE INVENTION

The present invention has been made in order to solve the above-mentioned problem associated with the prior art, and it is, therefore, an object of the present invention to provide a parking assisting device with which in-parallel parking of a vehicle can be readily carried out even in a narrow passage.

According to the present invention, there is provided a parking assisting device, including:

a camera for capturing an image behind a vehicle; a display provided to a dashboard of the vehicle; passage width measurement means for measuring a width of a passage; and a controller for displaying the image captured with the camera on the display, and for calculating an initial stopping position required for parking the vehicle in-parallel into a target parking space on the basis of the passage width measured with the passage width measurement means, to superimpose on a screen of the display a displayed image for guidance used for guiding the vehicle to the initial stopping position.

Note that the initial stopping position may a position corresponding to a steering wheel operation amount which is determined so that a vehicle front end on a side of the passage does not project from the passage width and the outermost end of rear wheels on a side of the parking space passes an entrance end of a parking space limit line. Alternatively, the initial stopping position may be substantially at a center of the passage width.

The parking assisting device according to the present invention may further include a steering angle sensor, and the parking assisting device may be structured such that a driver operates a steering wheel to move the vehicle backward so that the vehicle enters an entrance of the parking space from the initial stopping position, carries out turning operations in which forward movement of the vehicle made by fully steering the steering wheel to one direction, and backward movement of the vehicle made by fully steering the steering wheel to the opposite direction are repeated, and moves the vehicle straight back to thereby park the vehicle in-parallel into the parking space.

Further, the parking assisting device according to the present invention may further include yaw angle detection means for detecting a yaw angle of the vehicle, and the parking assisting device may be structured such that the controller calculates a position where the steering operation for the steering wheel should be changed, the position being required for the vehicle to be parked in-parallel from the initial stopping position into the parking space, and identifies a position of the vehicle from a yaw angle of the vehicle detected with the yaw angle detection means to provide a driver with guide information with respect to the position where the steering operation for the steering wheel should be changed.

Here, it is preferable that when a rear axle center of the vehicle reaches approximately a center of the parking space, and at the same time, a vehicle direction becomes approximately parallel with the parking space, the controller informs the driver of completion of the turning of the vehicle.

Here, it is preferable that an operation for the backward movement made by fully steering the steering wheel is carried out at such a turning angle that during the operation for the backward movement or the operation for the next forward movement after changing the steering operation for the steering wheel, a rear axle center of the vehicle reaches approximately a center of the parking space, and at the same time a vehicle direction becomes approximately parallel with the parking space, or at such a turning angle that during next forward movement after changing the steering operation for the steering wheel, when a front end of the vehicle reaches an edge of a passage, the rear axle center of the vehicle is located on a side of a front side limit line with respect to the center of the parking space.

On the other hand, it is preferable that an operation for the forward movement made by fully steering the steering wheel is carried out at such a turning angle that during the operation for the forward movement or the operation for the next backward movement after changing the steering operation for the steering wheel, a rear axle center of the vehicle reaches approximately a center of the parking space, and at the same time a vehicle direction becomes approximately parallel with the parking space, or at such a turning angle that during next backward movement after changing the steering Operation for the steering wheel, when a rear end of the vehicle reaches a rear side limit line of the parking space, the rear axle center of the vehicle is located on a side of a rear side limit line with respect to the center of the parking space.

In the parking assisting device according to the present invention, the passage width measurement means can measure the passage width using the displayed image for guidance on the display when the vehicle is stopped in the initial stopping position, or after the vehicle is stopped in the initial stopping position.

Further, the parking assisting device according to the present invention may further include parking space width measurement means for measuring a width of the parking space, and the parking assisting device may be structured such that the controller, in consideration of the width of the parking space measured with the parking space width measurement means, calculates a position where the steering operation for the steering wheel should be changed.

Note that the parking assisting device according to the present invention may be structured such that the controller calculates a locus of a front end of the vehicle on a side of the passage corresponding to a steering angle to superimpose on a screen of the display a predicted locus of the front end of the vehicle on the side of the passage, or a straight line which contacts the predicted locus of the front end of the vehicle on the side of the passage and which is parallel with the passage.

Further, the parking assisting device according to the present invention may further include a rotary switch for adjusting inclination of the displayed image for guidance in correspondence to an image on the display, and the parking assisting device may be structured such that the controller, in consideration of an inclination angle of the displayed image for guidance adjusted with the rotary switch, calculates the position where the steering operation for the steering wheel should be changed.

The parking assisting device according to the present invention may be structured such that the controller, on the basis of the position where the steering operation for the steering wheel is actually changed by a driver, calculates again a subsequent position where the steering operation for the steering wheel should be changed to provide the driver with the guide information. In this case, the parking assisting device may further include an obstacle detection sensor for detecting an obstacle in the circumference, and the controller, on the basis of a detection signal from the obstacle detection sensor, may provide the driver with the guide information.

Note that the parking assisting device according to the present invention may be structured such that the controller provides the driver with the number of times of steering of the steering wheel required for the vehicle to be parked in-parallel into the parking space from the initial stopping position.

Further, the parking assisting device according to the present invention may further include a speaker for providing a driver with guide information in the form of a voice.

The parking assisting device according to the present invention may employ as the yaw angle detection means a yaw rate sensor, or a steering angle sensor and a wheel velocity sensor.

DETAILED DESCRIPTION OF THE PREFERRED EMBODIMENTS

Preferred embodiments of the present invention will hereinafter be described in detail with reference to the accompanying drawings.

Embodiment 1

Figure 1:
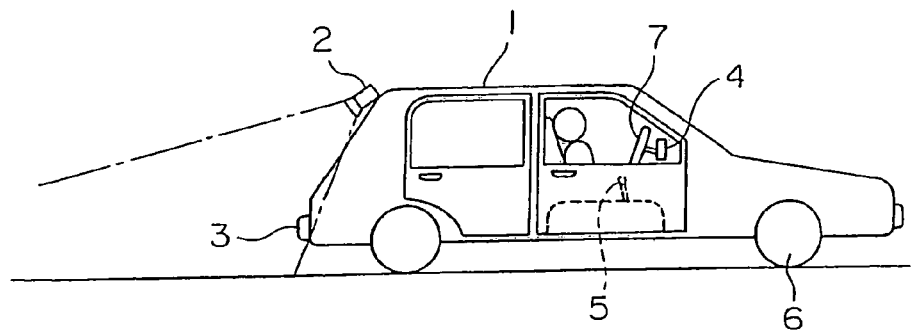
FIG. 1 is a side elevational view of a vehicle which is loaded with a parking assisting device according to Embodiment 1 of the present invention.

As shown in FIG. 1, a rear monitoring camera 2 for capturing an image of the view behind a vehicle 1 is mounted to the back of the vehicle 1. A rear bumper 3 of the vehicle 1 is provided in a position where it comes into a lower end portion of the view of the camera 2. A liquid crystal color display 4 is provided to a dashboard of the vehicle 1. The display 4 is normally used as a display for a navigation system. However, when parking assisting operations are carried out on the basis of the present invention, an image captured with the camera 2 is displayed on the screen of the display 4. In addition, a shift lever 5 is disposed on one side of the driver's seat. Front wheels 6 as wheels for turning the vehicle are steered by operations with a steering wheel 7.

Figure 2:
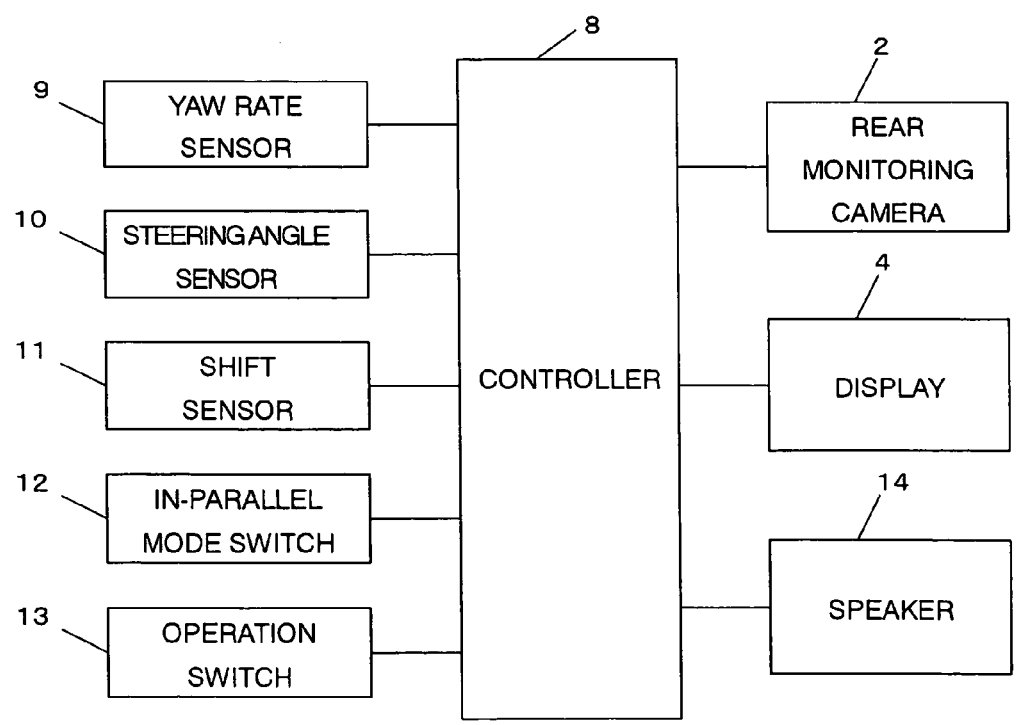
FIG. 2 is a block diagram showing a configuration of the parking assisting device according to Embodiment 1 of the present invention.

A configuration of a parking assisting device according to Embodiment 1 of the present invention is shown in FIG. 2. A controller 8 is connected to the camera 2 and the display 4. A yaw rate sensor 9 for detecting an angular velocity in a yaw angle direction of the vehicle 1, a steering angle sensor 10 for detecting a steering angle of the steering wheel 7, a shift sensor 11 for generating a backward movement signal when the shift lever 5 is shifted to a position for backward movement, are respectively connected to the controller 8. In addition, an in-parallel mode switch 12 for informing the controller 8 that in-parallel parking of the vehicle 1 is to be carried out, and an operation switch 13 for moving a displayed image for guidance on the screen of the display 4 are connected to the controller 8. Moreover, a speaker 14 for informing a driver of information concerned with driving operations is connected to the controller 8.

Though not illustrated in the figure, the controller 8 includes a CPU, a ROM storing therein a control program, and a RAM used to carry out operations.

The ROM stores data such as a minimum turning radius R when the steering wheel 7 of the vehicle 1 is steered to its maximum to turn the vehicle 1, and an entire length L and a width W of the vehicle 1. The ROM also stores the control program for carrying out parking assistance during in-parallel parking. The CPU is operated in accordance with the control program stored in the ROM. The controller 8 integrates the angular velocity of the vehicle 1 which is inputted from the yaw rate sensor 9 to calculate a yaw angle of the vehicle 1 and to calculate a turning angle of the vehicle 1 to thereby output to the speaker 14 information concerned with an operation method and with a position where the steering operation for the steering wheel 7 should be changed in each step during operations for parking.

Figure 3:
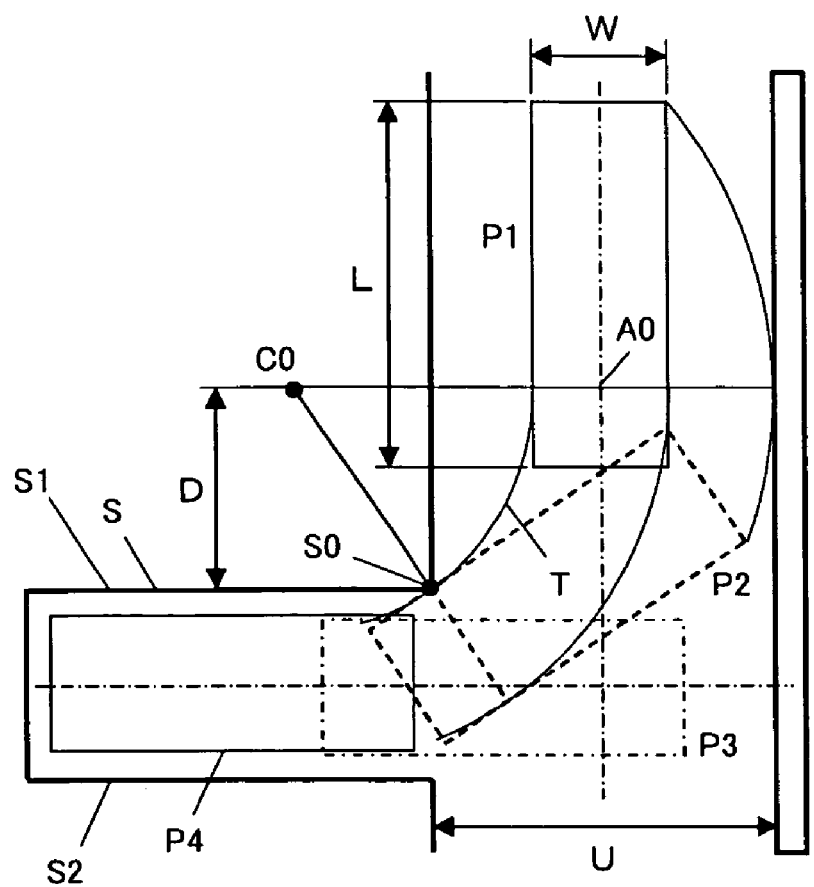
FIG. 3 is a view stepwise and schematically showing positions of a vehicle when in-parallel parking is carried out in Embodiment 1.

Here, along what route the parking assisting device of Embodiment 1 makes the vehicle travel in assisting the parking, will hereinafter be described with reference to FIG. 3. A case where the vehicle 1 is parked in-parallel to the left side of a passage is given as an example.

First, the vehicle 1 is stopped at an initial stopping position P1. The initial stopping position P1 is a position where a rear axle center A0 of the vehicle 1 lies approximately on a center line of a passage having a width U and is at a predetermined distance D from a front side limit line S1 of a target parking space S.

Next, as a first step, the steering wheel 7 is steered to the left such that a locus T of the left rear wheel comes into contact with an entrance end S0 of a front side limit line of the parking space S. The vehicle 1 is then moved backward while keeping this steering amount until it is stopped in a vehicle position P2 where the left rear wheel reaches the entrance end S0 of the front side limit line.

Then, as a second step, the steering wheel 7 is fully steered in the same direction to move the vehicle 1 backward, and the vehicle 1 is then stopped at a time point when the right rear end of the vehicle 1 comes into contact with a rear side limit line S2. Then, the steering wheel 7 is continued to be fully steered in the opposite direction to move the vehicle 1 forward until the right front end of the vehicle 1 comes into contact with an edge of the passage. Then, the steering wheel 7 is fully steered in the opposite direction again to move the vehicle 1 backward until the right rear end of the vehicle 1 comes into contact with the rear side limit line S2 of the parking space S. Such forward and backward movements are repeatedly carried out to turn the vehicle 1. At this time, a vehicle position where the vehicle 1 is located at the center of the parking space S and in parallel with the front side limit line S and the rear side limit line S2 is assigned a vehicle position P3.

Thereafter, as a third step, the vehicle 1 is moved straight back up to a vehicle position P4 further inside the parking space S to thereby complete the in-parallel parking.

Here, the initial stopping position P1 is set approximately on a center on the center line of the passage because the vehicle 1 is preferably brought as close to the parking space S side of the passage as possible in order to prevent the right front end of the vehicle 1 from interfering with the edge of the passage, and because the vehicle 1 is preferably kept as far from the parking space S as possible in order to prevent the left rear wheel of the vehicle 1 from interfering with the parking space S. By setting P1 approximately on the center line of the passage, both these antithetic requests can be properly met. In addition, the driver of the vehicle 1 can readily make a judgment on the basis of visual observation.

Next, the initial stopping position and the above-mentioned steps will hereinafter be described in detail.

Figure 4A:
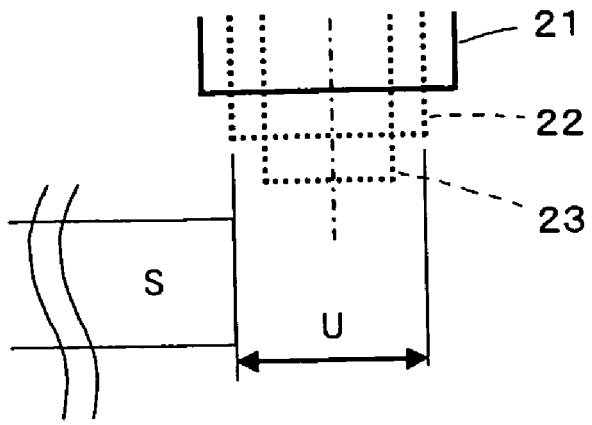
FIGS. 4A to 4C are views stepwise and schematically showing displayed images on a display when an initial stopping position is determined in Embodiment 1.
Figure 4B:
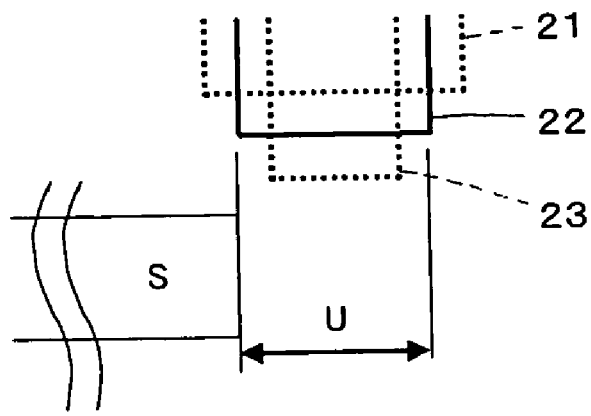
Figure 4C:
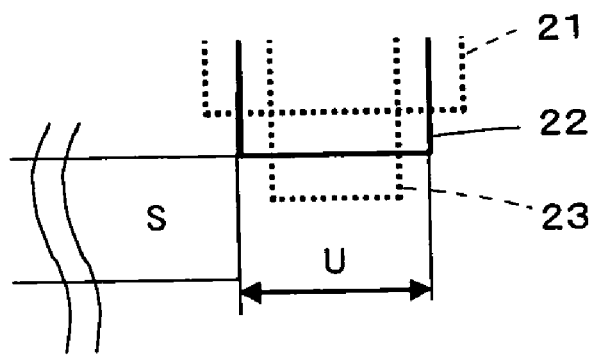

The driver moves the vehicle 1 forward to pass the parking space S while looking at the parking space S on the left-hand side, and then makes a judgment on the basis of the visual observation so that the vehicle 1 is located approximately on a center on the center line of the passage to stop the vehicle 1. Here, at the time when the driver turns ON the in-parallel mode switch 12, the controller 8 activates the program for the in-parallel parking. As a result, an image of the rear of the vehicle 1 captured with the camera 2 is displayed on the screen of the display 4, and also as shown in FIG. 4A, a displayed image for guidance consisting of a plurality of U-shape or rectangular guide lines 21 to 23 are displayed on the screen of the display 4 so as to be superimposed on the displayed image of the rear of the vehicle 1. The driver selects the guide line having a width nearest the passage width U, e.g., the guide line 22 as shown in FIG. 4B while looking at the displayed image on the screen of the display 4 using the operation switch 13 or a cursor (not shown). Moreover, the driver moves the vehicle 1 straight back until a horizontal line of the selected guide line 22 is located on a straight line with the front side limit line of the parking space S on the screen of the display 4 as shown in FIG. 4C. Thus, a place where the horizontal line of the guide line 22 is located on the straight line with the front side limit line of the parking space S becomes the initial stopping position 1 of the vehicle 1. Note that, while described later, if a passage width is given, then an amount of steering wheel operation, i.e., a minimum value of a turning radius in the first step will be determined on the basis of Expression (1) described later. If the turning radius determined so as to fall within a range of being equal to or larger than this minimum value, then the distance D is determined. The guide lines 21 to 23 are lines showing a relationship between their passage widths and the distance D. It should be noted that the number of times of steering in the second step becomes less as the turning radius is nearer the minimum value.

Note that, at a time point when the guide line 22 having a width nearest the passage width U is selected, the passage width U is measured and its data is inputted to the controller 8.

In addition, upon turning-ON of the in-parallel mode switch 12, predicted loci of the left and right rear wheels of the vehicle 1 corresponding to the steering angle of the steering wheel 7 at that time is displayed as parking guide information together with the displayed image for guidance on the screen of the display 4. Thus, in the first step, the driver has only to steer the steering wheel 7 so that a predicted locus of the left rear wheel comes into contact with the entrance end S0 of the front side limit line of the parking space S on the screen of the display 4, and move the vehicle 1 backward in that state. At this time, the controller 8 grasps a positional relationship between the initial stopping position P1 and the parking space S on the basis of detection signals from the steering angle sensor 10 and the yaw rate sensor 9, and a backward movement signal from the shift sensor 11. Then, as the vehicle 1 approaches the vehicle position P2 where the left side rear wheel of the vehicle 1 comes into contact with the entrance end S0 of the front side limit line, the controller 8 gives the driver approach information reporting the approach of the vehicle 1 to the vehicle position P2, and arrival information reporting the arrival of the vehicle 1 at the vehicle position P2 through the speaker 14. The driver stops the vehicle 1 in the vehicle position 2 in accordance with the arrival information.

In the subsequent second step, the driver fully steers the steering wheel 7 to the same direction to move the vehicle 1 backward. With this operation, the vehicle 1 enters more deeply the parking space S through the entrance of the parking space S, and hence the number of times of steering in the second step becomes less. The controller 8 judges the position of the vehicle 1 on the basis of the detection signal from the yaw rate sensor 9. As the right rear end of the vehicle 1 approaches the rear side limit line S2 of the parking space S, the controller 8 generates the approach information through the speaker 14, and at a time point when the right rear end of the vehicle 1 arrives at the rear side limit line S2, it generates the arrival information through the speaker 14. Then, the driver stops the vehicle 1 in accordance with the arrival information. Here, the driver fully steers the steering wheel 7 to the opposite direction and moves the vehicle 1 forward. As the right front end of the vehicle 1 approaches the edge of the passage, the controller 8 generates the approach information through the speaker 14, and at a time point when the right front end of the vehicle 1 arrives at the edge of the passage, it generates the arrival information through the speaker 14. Then, the driver stops the vehicle 1 in accordance with the arrival information. In this manner, the forward and the backward movements are repeatedly carried out, and at a time point when the vehicle 1 is located at the center of the parking space S and in parallel with the front side limit line S1 and the rear side limit line S2, the controller 8 generates information reporting completion of the turning of the vehicle through the speaker 14. As a result, the driver can stop the vehicle 1 in the vehicle position P3.

Thereafter, in the third step, the driver has only to move the vehicle 1 straight back. At this time, the driver can readily guide the vehicle 1 to the vehicle position P4 further inside the parking space S while looking at the image of the rear of the vehicle 1 captured with the camera 2, and the predicted loci displayed on the screen of the display 4.

Here, a description will hereinafter be given with respect to what locus the vehicle 1 takes from the initial stopping position P1 to arrive at the vehicle position P3 where the vehicle 1 is located at the center of the parking space S and in parallel with the front side limit line S1 and the rear side limit line S2. Note that, it is supposed that a movable area of the vehicle 1 is limited to only the whole area within the passage width and the parking space S.

The turning of the vehicle 1 in the first step from the initial stopping position P1 to the vehicle position P2 is assigned a 1a turning, and the turning in which the steering wheel 7 is fully steered to move the vehicle 1 backward in the beginning of the second step following the 1a turning is assigned a 1b turning.

When a width of the passage is U, a width of the parking space is P, a width of the vehicle is W, a length of the vehicle is L, a distance between the rear axle center and the rear end of the vehicle is A, and a turning radius of the 1a turning is $r_{1a}$ ($r_{1a}$ is not necessarily a minimum turning radius). Two conditions are supposed: a condition K1 that the outermost side of the left rear wheel passing the most inner side of the locus passes the entrance end S0 of the front side limit line of the parking space S; and a condition K2 that the right front end of the vehicle 1 passing the outermost side of the locus does not project from the passage width. Note that, in the condition K1, in practice, the outermost side may also be determined by adding a predetermined margin of a width for its calculation in order to prevent the vehicle 1 from coming too close to the entrance end S0 of the front side limit line. In this case, a predicted locus T of the left rear wheel of the vehicle 1 is superimposed on the displayed image on the screen with its space widened by the margin of a width. In the coordinate system in which the entrance end S0 of the front side limit line of the parking space S is set as the origin, and the front of the vehicle 1 and the right side of the vehicle 1 in the initial stopping position P1 are assumed y and x, respectively, when the coordinates of the turning center in the 1a turning are set as C1a ($xc_{1a}$, $yc_{1a}$) the following expression is obtained from the condition K2:

$$\{(r_{1a}+W/2)^2+(L-A)^2\}^{1/2} \leq r_{1a}+U/2$$

Then, the above expression can be transformed into Expression (1):

$$r_{1a} \geq \{(L-A)^2+(W/2)^2-(U/2)^2\}/(U-W) \quad (1)$$

In addition, the following expressions are obtained from the condition K1:

$$xc_{1a}=-(r_{1a}-U/2)$$

$$yc_{1a}=\{(r_{1a}-W/2)^2-(r_{1a}-U/2)^2\}^{1/2}$$

The y-coordinate $yc_{1a}$ means the coordinate of the rear axle center in the initial stopping position P1, i.e., the distance D.

The vehicle is stopped in the vehicle position P2 where the left rear wheel comes into contact with the entrance end S0 of the front side limit line of the parking space S. When a turning angle of the 1a turning at this time is assumed $\alpha_{11}$, $\alpha_{11}$ is expressed as follows:

$$\alpha_{11}=\arctan(-yc_{1a}/xc_{1a})$$

Figure 5:
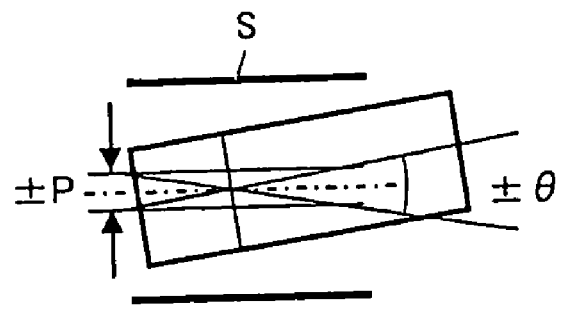
FIG. 5 is a view showing a position of a vehicle when parking of the vehicle is completed within a parking space.

Now, after completion of the turning of the vehicle in the vehicle position P3, the vehicle 1 is located at the center of the parking space S and in parallel with the parking space S in the vehicle movable area. Then, as shown in FIG. 5, there is set a practical completion condition J0 in which the rear axle center falls within an allowable distance of ±ΔP with respect to the center line of the parking space S, and also falls within an allowable angle of ±Δθ with respect to the center line of the parking space S.

In the second step, in order that "the vehicle may be located at the center of the parking space S and in parallel with the front side limit line and the rear side limit line", it is necessary to make forward and backward movements that meet the following two conditions J1 and J2.

The condition J1: It is regulated on the basis of such a condition that a backward movable angle during a (2n−1)-th turning meets the completion condition J0, or when the completion condition J0 is not met, the rear axle center during a (2n)-th turning next to the (2n−1)-th turning (the steering wheel is fully steered to move the vehicle forward) meets the completion condition J0, or is located on a side of the front side limit line S1 with respect to the center of the parking space S when the vehicle arrives at the edge of the passage. That is to say, if the rear axle center is located on the side of the front side limit line S1 with respect to the center of the parking space S, then the vehicle can be brought close to the center during a (2n+1)-th turning next but one to the (2n−1)-th turning.

The condition J2: It is regulated on the basis of such a condition that a forward movable angle during the (2n)-th turning meets the completion condition J0, or when the completion condition J0 is not met, the rear axle center during the (2n+1)-th turning next to the (2n)-th turning (the steering wheel is fully steered to move the vehicle backward) meets the completion condition J0, or is located on a side of the rear side limit line S2 with respect to the center of the parking space S when the vehicle arrives at the limit line of the parking space S. That is to say, if the rear axle center is located on the side of the rear side limit line S2 with respect to the center of the parking space S, then the vehicle can be brought close to the center during a (2n+2)-th turning next but one to the (2n)-th turning.

Note that, the backward movable angle during the (2n−1)-th turning means that the rear axle center can be moved backward so as to be located only in a range capable of becoming the side of the front side limit line S1 with respect to the center of the parking space S through the steering operation during the next (2n)-th turning, and hence does not necessarily mean that the rear axle center is moved backward until the vehicle 1 comes into contact with the limit line of the parking space S. However, in the case of a standard parking space S, these two agree with each other, and hence the vehicle has only to be moved backward until the vehicle 1 comes into contact with the limit line of the parking space S. A case where the vehicle 1 can not be moved backward until the vehicle 1 comes into contact with the limit line of the parking space S is caused in a case where a position of the vehicle becomes considerably parallel with the parking space S.

Likewise, the forward movable angle during the (2n)-th turning means that the rear axle center can be moved forward so as to be located only in a range capable of becoming the side of the near side limit line S2 with respect to the center of the parking space S, and hence does not necessarily mean that the vehicle 1 is moved forward until the front end of the vehicle 1 comes into contact with the edge of the passage. But, in general, these two agree with each other, and hence the vehicle 1 has only to be moved forward until the front end of the vehicle 1 comes into contact with the edge of the passage. A case where the vehicle 1 can not be moved forward until the front end of the vehicle 1 comes into contact with the edge of the passage is caused in a case where a position of the vehicle becomes considerably parallel with the parking space S.

On the basis of these conditions J1 and J2, the rear axle center approaches the center of the parking space S while being vibrated right and left.

On the basis of these conditions J1 and J2, the turning of the vehicle is completed after completion of the driving operations of the 1b turning→the second turning→ ... →the (2n−1)-th turning→the (2n)-th turning→the (2n+1)-th turning→ ... , and a steering amount is determined from completion of the final vehicle turning. Thus, steering amounts for the previous vehicle turnings are successively determined.

Since the number of times of turning, steering amounts and the like are uniquely determined on the basis of a vehicle condition such as a turning radius of the vehicle 1 and a mounting position of the camera 2, a passage condition such as the passage width U, and a parking space condition such as a width of the parking space S, the steering amounts can be successively calculated retroactively from the completion of the vehicle turning.

When the coordinates of the center of the 1b turning from the vehicle position P2 are set as $C1b(xc_{1b}, yc_{1b})$, since the turning radius becomes the minimum turning radius R from $r_{1a}$ here, the following expressions are obtained:

$$xc_{1b}=xc_{1a}+(r_{1a}-R)\cos\alpha_{11}$$

$$yc_{1b}=yc_{1a}-(r_{1a}-R)\sin\alpha_{11}$$

A turning angle in the 1b turning is assumed $\alpha_{12}$, and $\alpha_1$ is set equal to $(\alpha_{11}+\alpha_{12})$. In addition, the number of times of turning in the second step is changed due to the passage width and the like. However, here, a situation B of the turning in the second step is described on condition that "0" is the turning until the vehicle 1 comes into contact with the parking space S or the edge of the passage, "1" is the turning when the vehicle 1 does not come into contact with the parking space S or the edge of the passage, and "F" is the last turning. For example, "B0010F" indicates that the turning until the vehicle 1 comes into contact with the parking space S or the edge of the passage is continuously carried out twice, and then the turning when the vehicle 1 does not come into contact with the parking space S, and the turning until the front end of the vehicle 1 comes into contact with the edge of the passage are successively carried out, followed by the final turning. That is, the five turning operations in total are carried out to complete the second step.

(1) When the completion condition J0 is met in the 1b turning, the turning operations are expressed as "BF". A case where the passage width U is wide corresponds to this case.

Since the following expression $$\alpha_1=(\alpha_{11}+\alpha_{12})=90°$$

is established, the above expression can be transformed into the following expression:

$$\alpha_{12}=90°-\alpha_{11}$$

(2) When the completion condition J0 is met in the next second turning, the turning operations can be expressed as "BXF" (X is one of 0 and 1).

When the turning angle and the turning radius (the last turning radius is not necessarily the minimum turning radius R) in the second turning are assumed $\alpha_2$ and r, respectively, the coordinates $C2$ $(xc_2, yc_2)$ of the center in the second turning are expressed as follows:

$$xc_2=xc_{1b}+(R+r)\cos\alpha_1$$

$$yc_2=yc_{1b}-(R+r)\sin\alpha_1$$

Since the parking is completed after the second turning, the following expression is obtained:

$$\alpha_1+\alpha_2=90°$$

Then, when the coordinates of the rear axle center are set as A2 $(xa_2, ya_2)$, since a rear axle center A2 is a center of the parking space S, $ya_2$ is expressed as follows:

$$ya_2 = yc_2 + r\sin(\alpha_1 + \alpha_2)$$
$$= yc_{1b} - (R+r)\sin\alpha_1 + r$$
$$= -P/2$$

Figure 6:
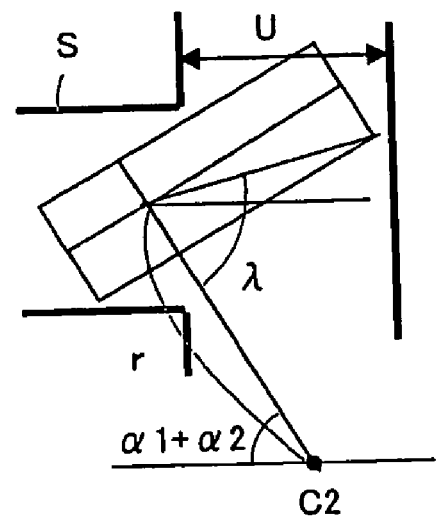
FIGS. 6 to 10 are views each showing a position of a vehicle in the middle of parking in-parallel.

Further, as shown in FIG. 6, the following relationship is established since the in-parallel parking is completed and the vehicle 1 does not come into contact with the edge of the passage:

$$xc_2-r\cos(\alpha_1+\alpha_2)+\{(W/2)^2+(L-A)^2\}^{1/2}\cos(\alpha_1+\alpha_2-\lambda)$$
$$\leq U$$

Here, $\lambda=\arctan\{(L-A)/(W/2)\}$

At this stage, $\alpha_{12}$, $\alpha_2$ and r are not yet determined.

(2-1) When the vehicle 1 comes into contact with the limit line of the parking space S during the backward movement in the 1b turning, the turning operations are expressed as "B0F".

Figure 7:
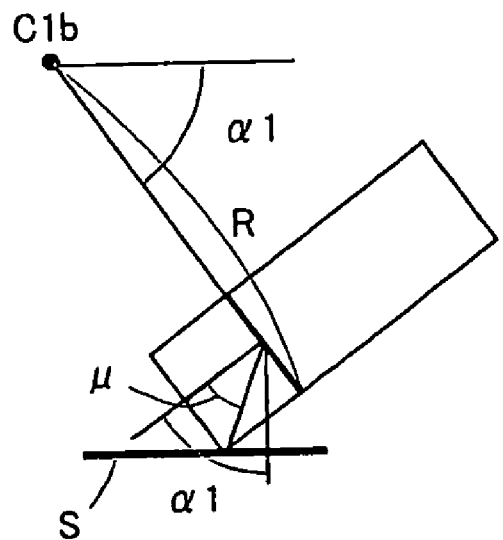

As shown in FIG. 7, the following expression is established:

$$R\sin\alpha_1+\{A^2+(W/2)^2\}^{1/2}\cos(\alpha_1-\mu)=yc_{1b}+P$$

Thus, $\alpha_{12}$ is determined from the expression $\mu = \arctan\{(W/2)/A\}$, and $\alpha_2$ and $r$ are also determined.

(2-2) When the vehicle 1 does not come into contact with the limit line of the parking space S during the backward movement in the 1b turning, the turning operations can be expressed as "B1F".

$\alpha_{12}$ in a certain range satisfying the following expression:

$$R \sin\alpha_1 + \{A^2 + (W/2)^2\}^{1/2} \cos(\alpha_1 - \mu) < yc_{1b} + P$$

is determined, and $\alpha_2$ and $r$ are also determined.

(3) When the completion condition J0 is not met in the next turning, but is met in the third turning, the turning operations can be expressed as "BXXF".

When the turning angle and the turning radius (the last turning radius is not necessarily the minimum turning radius R) in the third turning are assumed $\alpha_3$ and $r$, respectively, the coordinates C3 ($xc_3$, $yc_3$) of the center in the third turning are expressed as follows:

$$xc_3 = xc_2 - (R+r)\cos(\alpha_1 + \alpha_2)$$

$$yc_3 = yc_2 + (R+r)\sin(\alpha_1 + \alpha_2)$$

Since the parking is completed after the third turning, the following expression is obtained:

$$\alpha_1 + \alpha_2 + \alpha_3 = 90°$$

Then, when the coordinates of the rear axle center are set as A3 ($xa_3$, $ya_3$), $ya_3$ is expressed as follows:

$$ya_3 = yc_3 - r\sin(\alpha_1 + \alpha_2 + \alpha_3)$$
$$= yc_2 + (R+r)\sin(\alpha_1 + \alpha_2) - r$$
$$= -P/2$$

Figure 8:
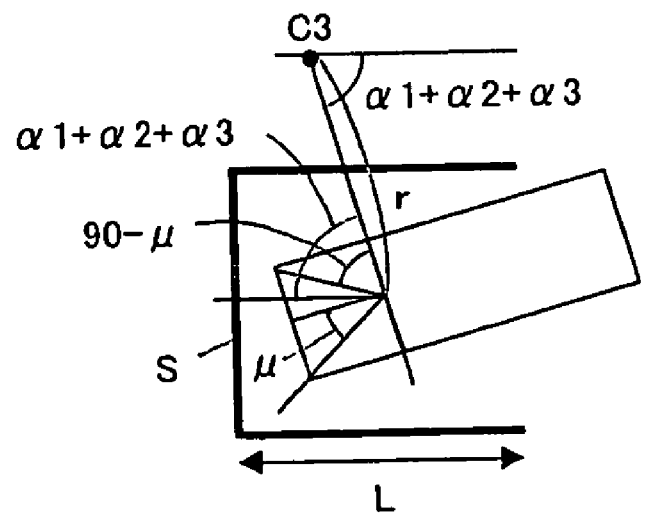

At this time, as shown in FIG. 8, the following relationship is established on the basis of the condition in which the left rear end of the vehicle 1 does not come into contact with the innermost part of the parking space S:

$$xa_3 - \{A^2 + (W/2)^2\}^{1/2} \cos\{\alpha_1 + \alpha_2 + \alpha_3 - (90° - \mu)\} \geq -L$$

In addition, in the second turning, the y-coordinate of the rear axle center, on the basis of the condition J1, needs to lie on the side of the front side limit line S1 with respect to the center of the parking space S. Therefore, the following expression is established:

$$ya_2 - (-P/2) = yc_2 + R\sin(\alpha_1 + \alpha_2) + P/2 \geq 0$$

(3-1) When the vehicle 1 comes into contact with the limit line of the parking space S during the backward movement in the 1b turning, and the front end of the vehicle 1 comes into contact with the edge of the passage during the forward movement in the second turning, the turning operations are expressed as "B00F".

Since the front end of the vehicle 1 comes into contact with the edge of the passage in the second turning, the following expression is established:

$$xc_2 - R\cos(\alpha_1 + \alpha_2) + \{(W/2)^2 + (L-A)^2\}^{1/2} \cos(\alpha_1 + \alpha_2 - \lambda) = U$$

Since the vehicle 1 comes into contact with the limit line of the parking space S in the 1b turning, the following expression is established:

$$R\sin\alpha_1 + \{A^2 + (W/2)^2\}^{1/2} \cos(\alpha_1 - \mu) = yc_{1b} + P$$

Thus, $\alpha_{12}$ is determined, and $\alpha_2$, $\alpha_3$ and $r$ are also determined.

(3-2) When the vehicle 1 comes into contact with the limit line of the parking space S during the backward movement in the 1b turning, and the front end of the vehicle 1 does not come into contact with the edge of the passage during the forward movement in the second turning, the turning operations can be expressed as "B01F".

Since the front end of the vehicle 1 does not come into contact with the edge of the passage in the second turning, the following expression is established:

$$xc_2 - R\cos(\alpha_1 + \alpha_2) + \{(W/2)^2 + (L-A)^2\}^{1/2} \cos(\alpha_1 + \alpha_2 - \lambda) < U$$

Since in the 1b turning, the vehicle 1 comes into contact with the limit line of the parking space S, the following expression is established:

$$R\sin\alpha_1 + \{A^2 + (W/2)^2\}^{1/2} \cos(\alpha_1 - \mu) = yc_{1b} + P$$

Thus, $\alpha_{12}$ is determined, and $\alpha_2$, $\alpha_3$ and $r$ are also determined.

(3-3) When the vehicle 1 does not come into contact with the limit line of the parking space S during the backward movement in the 1b turning, and the front end of the vehicle 1 comes into contact with the edge of the passage during the forward movement in the second turning, the turning operations can be expressed as "B10F".

Since the front end of the vehicle 1 comes into contact with the edge of the passage in the second turning, the following expression is established:

$$xc_2 - R\cos(\alpha_1 + \alpha_2) + \{(W/2) + (L-A)^2\}^{1/2} \cos(\alpha_1 + \alpha^2 - \lambda) = U$$

Since the vehicle 1 does not come into contact with the limit line of the parking space S in the 1b turning, the following expression is established:

$$R\sin\alpha_1 + \{A^2 + (W/2)^2\}^{1/2} \cos(\alpha_1 - \mu) < yc_{1b} + P$$

Thus, $\alpha_{12}$ is determined, and $\alpha_2$, $\alpha_3$ and $r$ are also determined.

(3-4) When the vehicle 1 does not come into contact with the limit line of the parking space S during the backward movement in the 1b turning, and the front end of the vehicle 1 does not come into contact with the edge of the passage during the forward movement in the second turning, the turning operations can be expressed as "B11F".

Since the front end of the vehicle 1 does not come into contact with the edge of the passage in the second turning, the following expression is established:

$$xc_2 - R\cos(\alpha_1 + \alpha_2) + \{(W/2)^2 + (L-A)^2\}^{1/2} \cos(\alpha_1 + \alpha_2 - \lambda) < U$$

Since the vehicle 1 does not come into contact with the limit line of the parking space S also in the 1b turning, the following expression is established:

$$R\sin\alpha_1 + \{A^2 + (W/2)^2\}^{1/2} \cos(\alpha_1 - \mu) < yc_{1b} + P$$

Thus, $\alpha_{12}$ is determined, and $\alpha_2$, $\alpha_3$ and r are also determined.

(4) Likewise, a case where the turning operations are completed in the fourth turning, a case where the turning operations are completed in the fifth turning, in the sixth turning, in the seventh turning, and so forth may be successively analyzed. In this case, the coordinates Cm($xc_m$, $yc_m$) of the center in the m-th turning are expressed as follows:

$$xc_{2n} = xc_{2n-1} + (R+r)\cos(\alpha_1 + \ldots + \alpha_{2n-1})$$

$$yc_{2n} = yc_{2n-1} - (R+r)\sin(\alpha_1 + \ldots + \alpha_{2n-1})$$

$$xc_{2n+1} = xc_{2n} - (R+r)\cos(\alpha_1 + \ldots + \alpha_{2n})$$

$$yc_{2n+1} = yc_{2n} + (R+r)\sin(\alpha_1 + \ldots + \alpha_{2n})$$

Then, in the cases other than the case where the turning operations are completed in the second step, a relationship of r=R is obtained.

Figure 9:
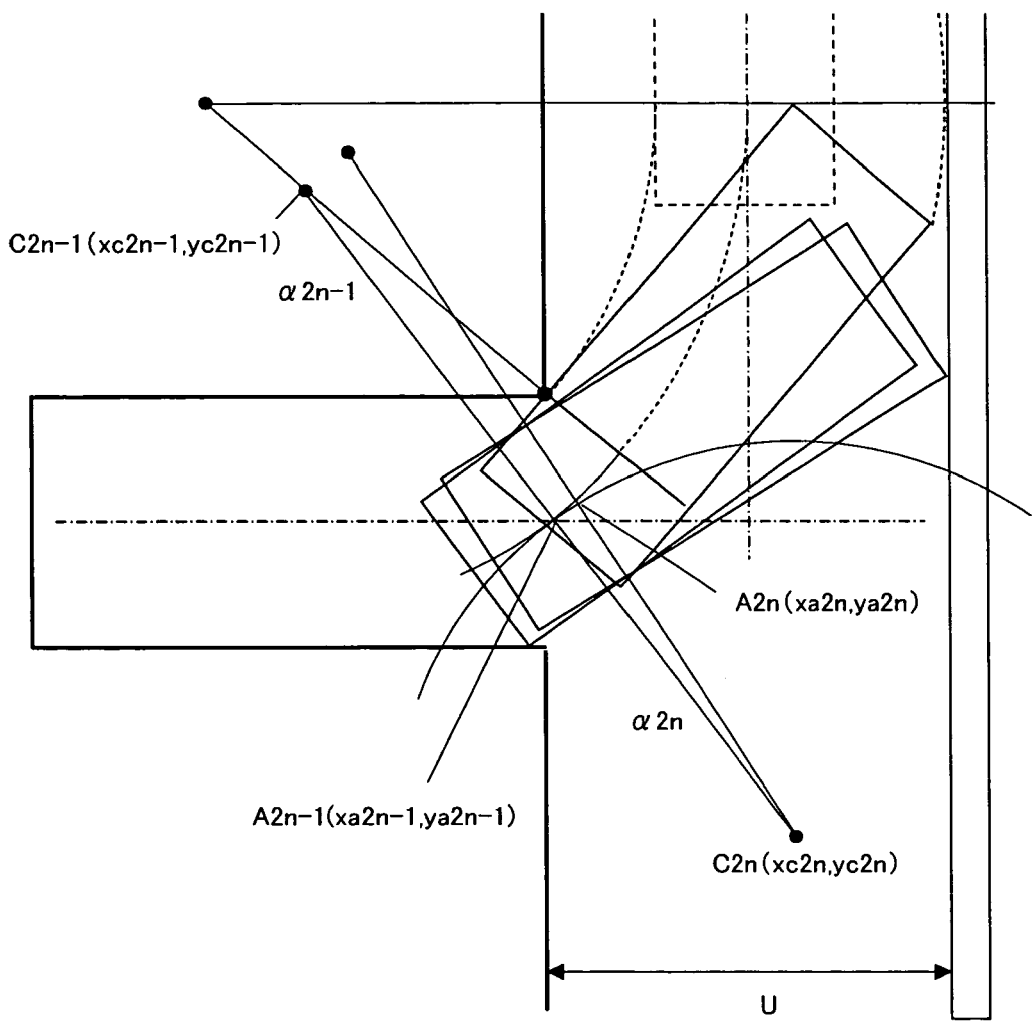

In addition, when the turning angle in the backward movement in the (2n−1)-th turning is assumed $\alpha_{2n-1}$, and the turning angle in the forward movement in the next (2n)-th turning is assumed $\alpha_{2n}$, as shown in FIG. 9, the condition J1 is expressed as follows:

$$ya_{2n} + P/2 = yc_{2n} + R\sin(\alpha_1 + \ldots + \alpha_{2n}) + P/2$$
$$= yc_{2n-1} - 2R\sin(\alpha_1 + \ldots + \alpha_{2n-1}) +$$
$$R\sin(\alpha_1 + \ldots + \alpha_{2n}) + P/2$$
$$\geq 0$$

Figure 10:
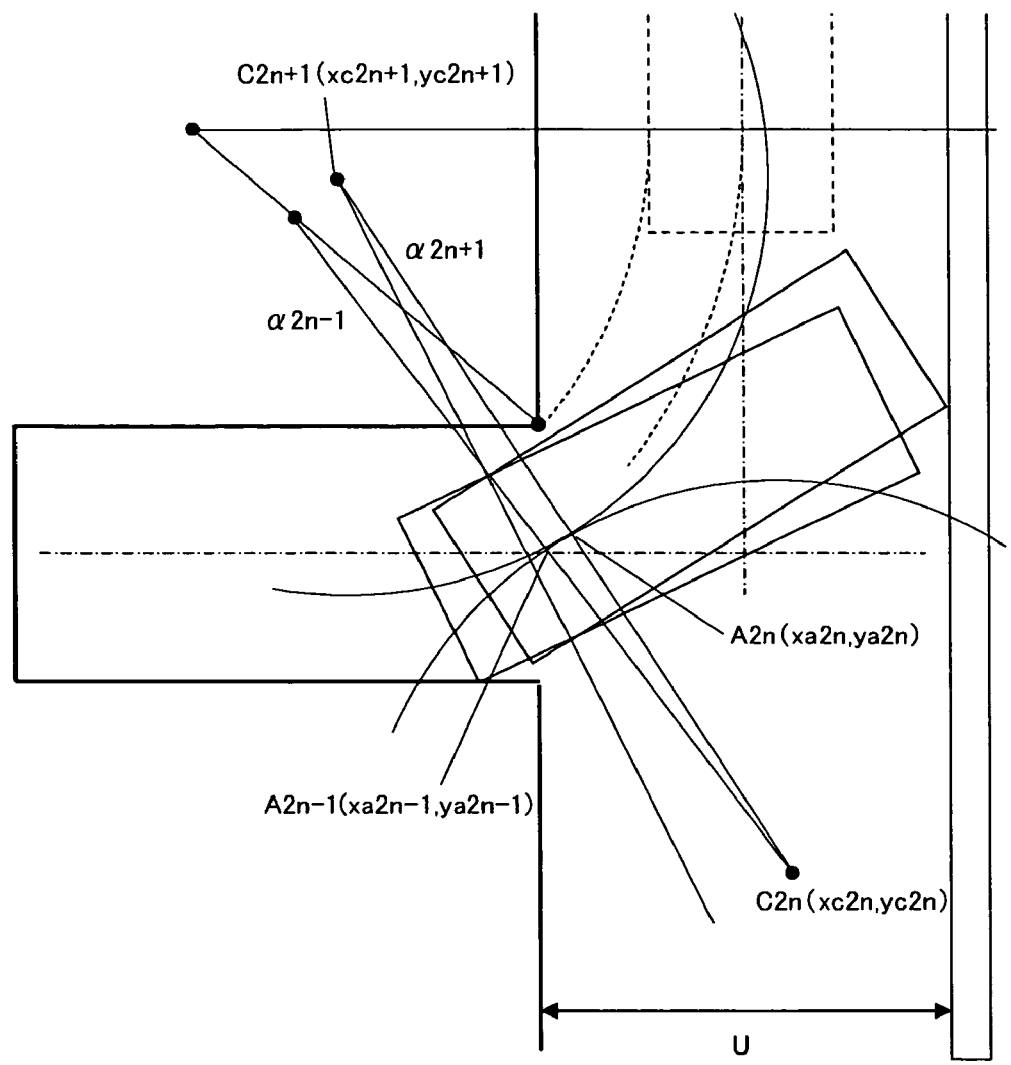

When the turning angle in the forward movement in the (2n)-th turning is assumed $\alpha_{2n}$, and the turning angle in the backward movement in the next (2n+1)-th turning is assumed $\alpha_{2n+1}$, as shown in FIG. 10, the condition J2 is expressed as follows:

$$ya_{2n+1} + P/2 = yc_{2n+1} - R\sin(\alpha_1 + \ldots + \alpha_{2n+1}) + P/2$$
$$= yc_{2n} - 2R\sin(\alpha_1 + \ldots + \alpha_{2n}) -$$
$$R\sin(\alpha_1 + \ldots + \alpha_{2n+1}) + P/2$$
$$\leq 0$$

Here, when a minimum value $r_{1amin}$ of the turning radius in the 1a turning for the passage width U (note that the minimum value is the minimum turning radius R when the minimum value is smaller than the minimum turning radius R) is calculated with respect to a vehicle ES in which a vehicle width W is 1.79 m, the total length L is 4.75 m, a distance A between the rear end of the vehicle ES and the rear axle center is 1 m, and the minimum turning radius R is 4.03 m, the following table is obtained:

| U (m) | $r_{1amin}$ (m) |
|---|---|
| 3.9 | 5.24 |
| 4 | 4.92 |
| 4.32 | 4.03 |
| 4.5 | 4.03 |
| 5 | 4.03 |

From the above table, it is understood that when the vehicle ES is stopped on the center line of the passage to be turned, in the case of the passage having a width smaller than 4.32 m, if the minimum value of the turning radius is not equal to or larger than each of the above-mentioned values, then the vehicle hits the edge of the passage, but in the case of the passage having a width larger than 4.32 m, even if the minimum turning radius is 4.03 m, the vehicle does not hit the edge of the passage. Since the initial stopping position D becomes closer to the parking space S as the turning radius $r_{1a}$ in the 1a turning approaches $r_{1amin}$, the guide line in the image captured with the camera becomes easy, and the vehicle can be turned to be moved backward to enter the innermost part of the parking space S. Thus, this operation is desirable. Note that, the turning radius $r_{1a}$ in the 1a turning can be a value equal to or larger than $r_{1amin}$ in correspondence with the passage width U. However, since the distance D with respect to the initial stopping position P1 is not determined unless the turning radius $r_{1a}$ is determined, then it is necessary to determine the turning radius $r_{1a}$ in advance before the distance D is determined.

Figure 11:
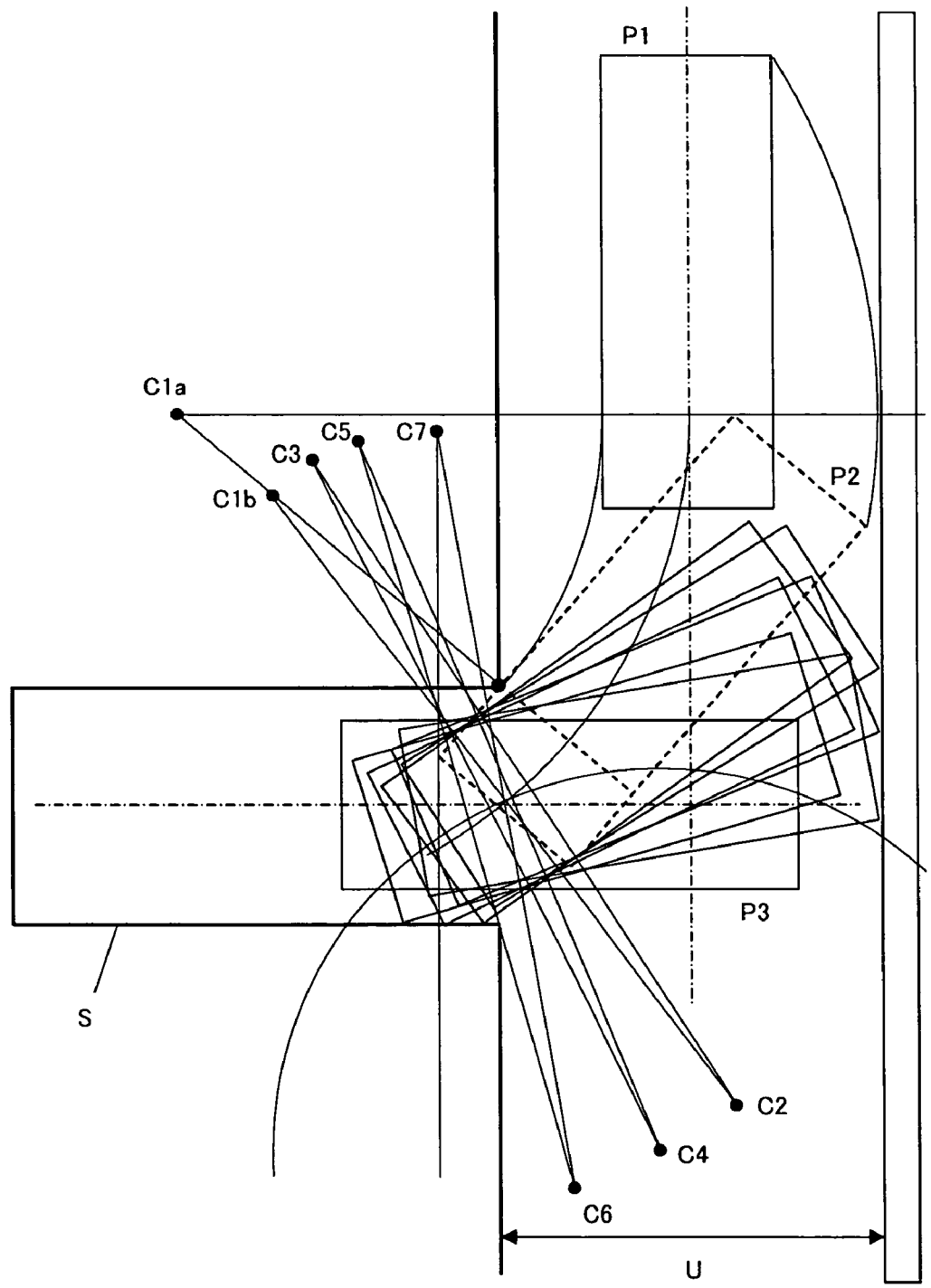
FIGS. 11 to 15 are views showing first to fifth operational examples when a vehicle is parked in-parallel.

An example of operations when the vehicle ES is parked in-parallel into the parking space S through the passage having a width U of 3.9 m is shown in FIG. 11. As apparent from FIG. 11, the vehicle needs to be turned seven times in the second step from the vehicle position P2 to the vehicle position P3. Thus, in accordance with the above-mentioned description, these turning operations are expressed as "B000000F".

Figure 12:
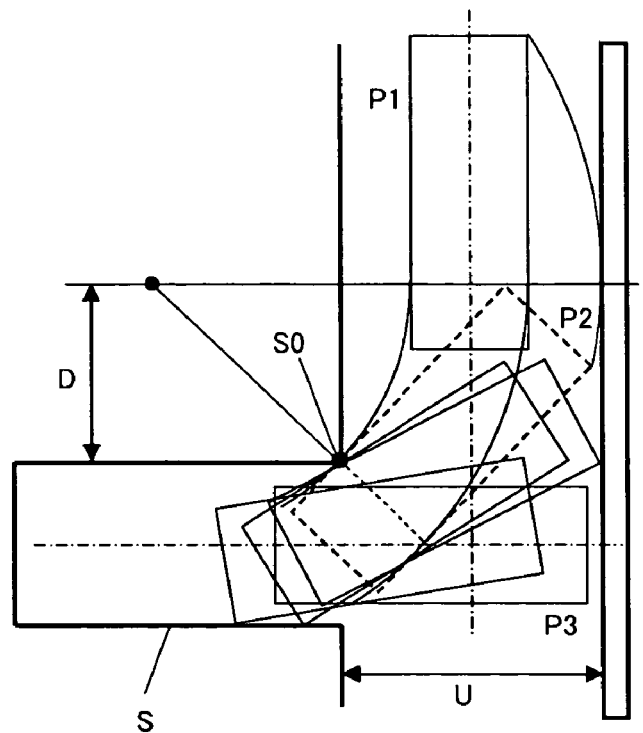

Likewise, an example of operations when the vehicle ES is parked in-parallel into the parking space S through the passage having a width U of 4 m is shown in FIG. 12. In this case, the vehicle needs to be turned four times in the second step.

Figure 13:
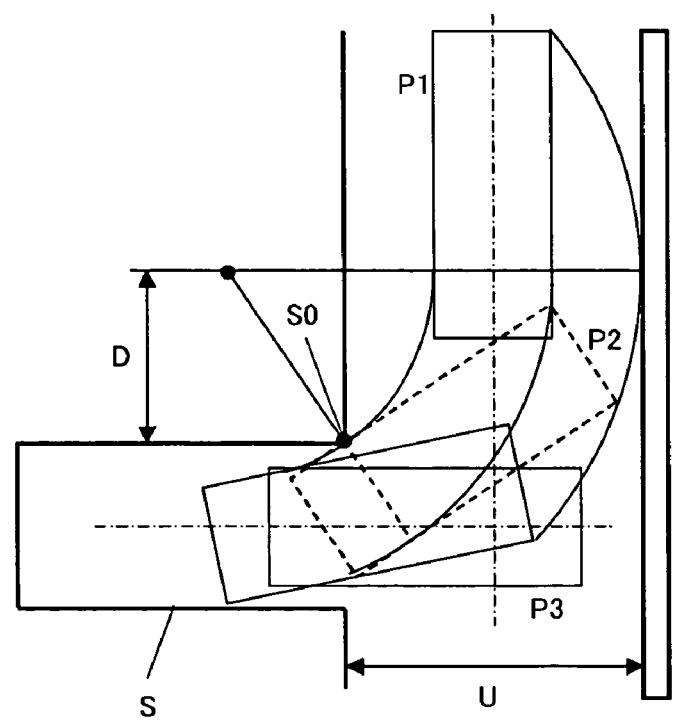

In addition, when the vehicle ES is parked in-parallel into the parking space S through the passage having the width U of 4.32 m, as shown in FIG. 13, in the second step, the vehicle needs to be turned only twice.

Figure 14:
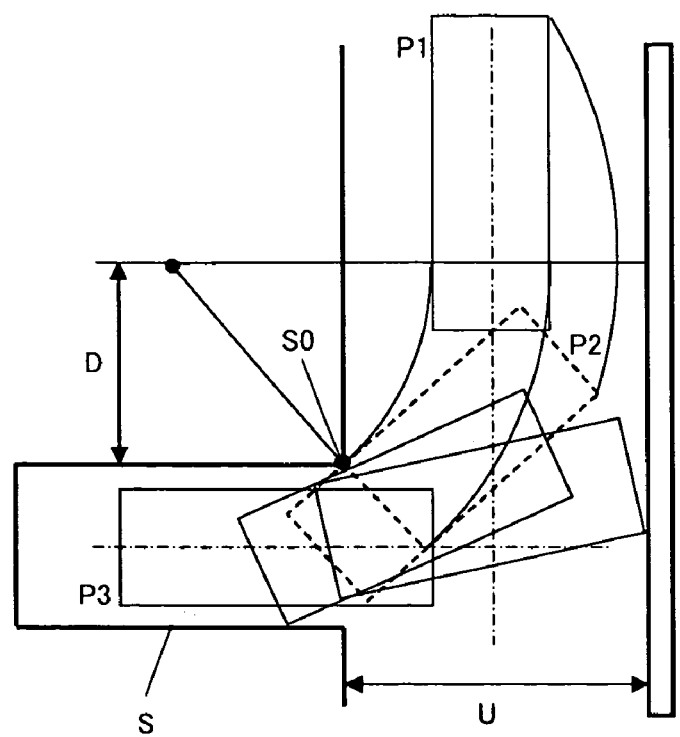
Figure 15:
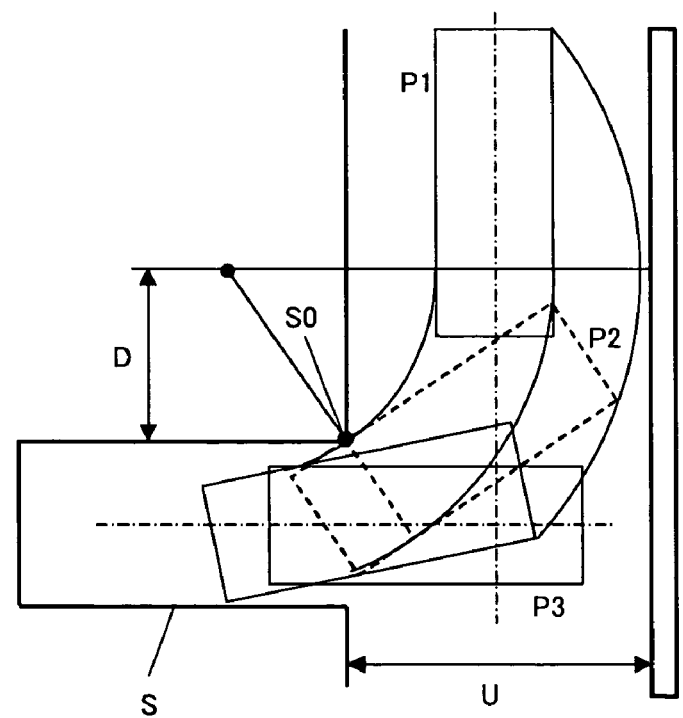

In the case of the passage having a width U of 4.5 m, as shown in FIG. 14, when the rear axle center of the vehicle ES in the initial stopping position P1 is located at a distance D of 3 m from the front side limit line S1 of the parking space S, the vehicle ES needs to be turned three times in the second step. However, when as shown in FIG. 15, when the rear axle center in the initial stopping position P1 is located at a distance D of 2.58 m from the front side limit line S1 of the parking space S, the vehicle Es needs to be turned only twice in the second step.

Embodiment 2

In the above-mentioned Embodiment 1, images of a plurality of U-shape guide lines 21 to 23 are displayed on the screen of the display as the displayed image for guidance, and the guide line having a width nearest the passage width U is selected among those guide lines. However, there may also be adopted a constitution that an image of only one U-shape guide line is displayed, and a length of this guide line in a cross direction is adjusted to be made to coincide with the passage width U by operating the operation switch 13. With this constitution, a width of the guide line can be made to perfectly coincide with the passage width U, enabling accurate measurement of the passage width U.

Embodiment 3

In the above-mentioned Embodiment 1, images of a plurality of U-shape guide lines 21 to 23 are displayed on the screen of the display as the displayed image for guidance.

Figure 16A:
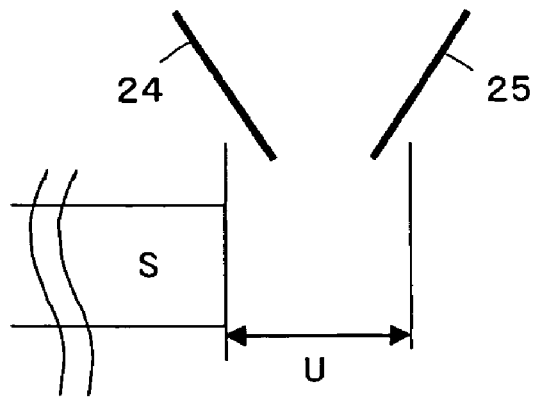
FIGS. 16A to 16C, 17, 18 and 19A to 19C are views each stepwise and schematically showing a display image on a display when an initial stopping position is determined in Embodiments 3, 4, 5 and 7.
Figure 16B:
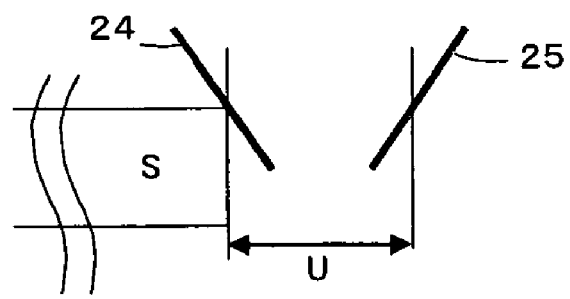
Figure 16C:
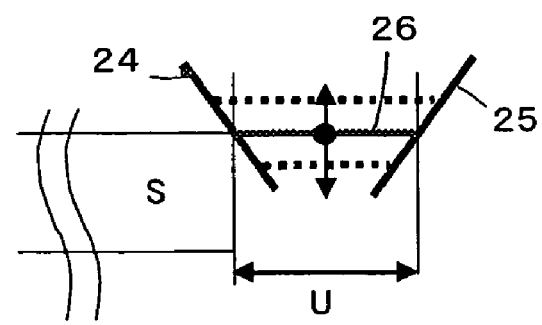

However, in Embodiment 3, as shown in FIGS. 16A to 16C, a pair of left and right oblique lines 24 and 25 are used for the displayed image for guidance. Those oblique lines 24 and 25 correspond to lines which are obtained by connecting corner portions of the U-shape guide lines 21 to 23 in Embodiment 1 shown in FIGS. 4A to 4C. Here, the oblique lines 24 and 25 are not intended to be limited to straight lines. While those lines may also become curves in accordance with how the turning radius $r_{1a}$ in the 1a turning is determined in a range of being equal to or larger than $r_{1amin}$, those lines are shown in the form of straight lines for the sake of easiness of description.

The vehicle 1 is stopped on the center line of the passage having the width U, and then is continued to be moved backward until one of the oblique lines 24 and 25 coincides with the entrance end S0 of the front side limit line of the parking space S on the screen of the display 4, and then stopped. This position of the vehicle 1 becomes the initial stopping position P1. Here, an image of a display line 26 for measurement of a passage width in a transverse direction which connects a pair of oblique lines 24 and 25 is superimposed on the displayed image on the screen by operating the operation switch 13. Moreover, the image of the display line 26 for measurement of a passage width is vertically moved by operating the operation switch 13 to be made to coincide with the passage width to thereby measure the passage width U.

Embodiment 4

Figure 17:
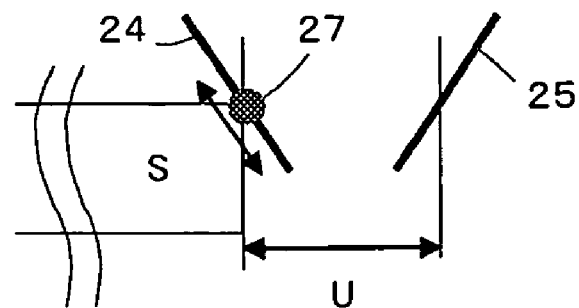

In the above-mentioned Embodiment 3, a counter mark 27 movable on the oblique lines 24 and 25, as shown in FIG. 17, is superimposed on the displayed image on the screen instead of displaying the display line 26 for measurement of a passage width in a transverse direction. Then, this counter mark 27 is moved to be made to coincide with the entrance end S0 of the front side limit line by operating the operation switch 13 to thereby measure the passage width U.

Embodiment 5

Figure 18:
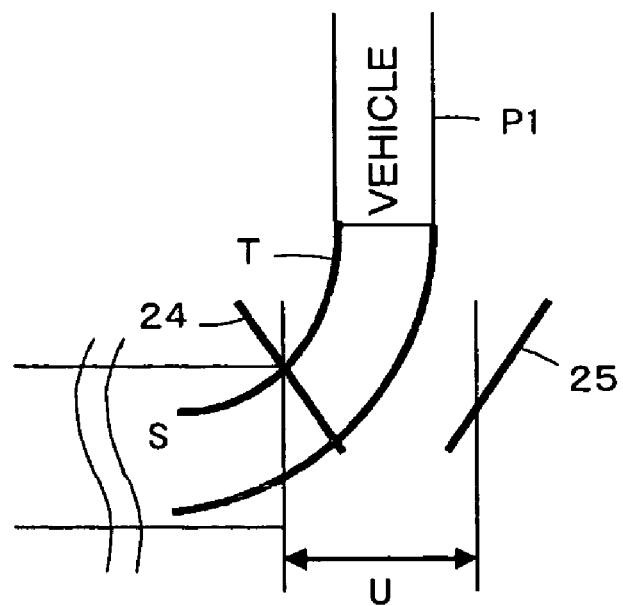

In addition, as shown in FIG. 18, in the above-mentioned Embodiment 3, after the vehicle 1 is stopped in the initial stopping position P1, the steering wheel 7 is steered so that in the first step, a predicted locus T of the left rear wheel comes into contact with the entrance end S0 of the front side limit line of the parking space S. Here, the operation switch 13 is turned ON or the beginning of movement of the vehicle 1 is detected with the yaw rate sensor 9, a wheel velocity sensor, or the like to acquire a steering angle at this time from the steering angle sensor 10. Accordingly, the distance D up to the parking space S and the passage width U can be obtained.

Embodiment 6

In addition, as shown in FIG. 18, in the above-mentioned Embodiment 3, after the vehicle 1 is stopped in the initial stopping position P1, the steering wheel 7 is steered so that the counter mark 27 which will be moved on the oblique lines 24 and 25 in accordance with the steering operation is made to coincide with the entrance end S0 of the front side limit line of the parking space S. Here, the operation switch 13 is turned ON or the beginning of movement of the vehicle 1 is detected with the yaw rate sensor 9, a wheel velocity sensor, or the like to acquire a steering angle at this time from the steering angle sensor 10. Accordingly, the distance D up to the parking space S, the passage width U, and a steering amount suitable for this time can be simultaneously determined.

In this case, the counter mark 27 maybe displayed on a position corresponding to the passage width U which is obtained by substituting the turning radius $r_{1a}$ determined on the basis of the steering angle into Expression (1) to solve Expression (1) with respect to the passage width U.

In addition, two vertical lines a distance between which will be changed in accordance with the steering operation for the steering wheel 7 may also be displayed instead of the counter mark 27. In this case, the steering wheel is continued to be steered until the two vertical lines are made to coincide with the passage width U, and at this time point, the steering wheel is fixed. Then, the operation switch 13 is turned ON or the beginning of movement of the vehicle 1 is detected with the yaw rate sensor 9, a wheel velocity sensor, or the like to acquire a steering angle at this time from the steering angle sensor 10. Accordingly the distance D up to the parking space S, the passage width U, and a steering amount suitable for this time can be simultaneously determined.

An interval between the two vertical lines, similarly to the case of the above-mentioned counter mark, may be expressed as a width corresponding to the passage width U which is obtained by substituting the turning radius determined on the basis of the steering angle into Expression (1) to solve Expression (1) with respect to the passage width U.

Embodiment 7

Figure 19A:
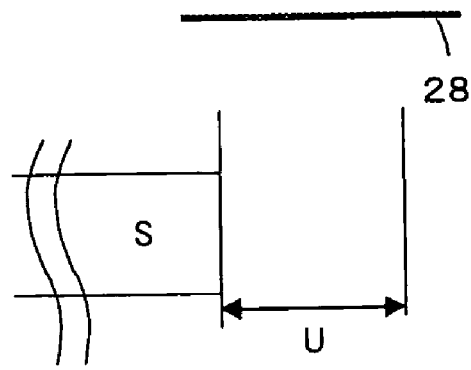

A degree of freedom of the initial stopping position P1 from which the vehicle 1 can be parked in-parallel into the parking space S is lower as the passage width U is narrower. Then, on the supposition of a narrow passage, instead of the guide lines 21 to 23 in the above-mentioned Embodiment 1, and the oblique lines 24 and 25 in the above-mentioned Embodiment 2, a transversely straight guide line 28 having a fixed vertical display position as shown in FIG. 19A may also be superimposed as the displayed image for guidance on a displayed image on the screen of the display 4.

Figure 19B:
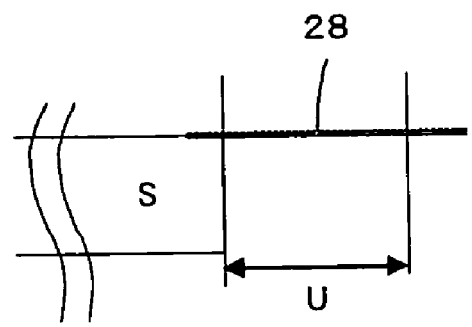
Figure 19C:
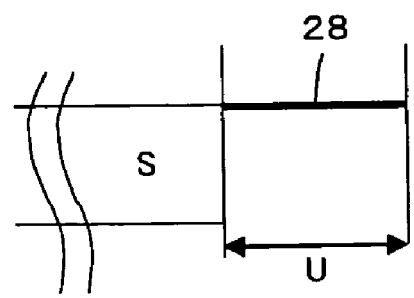

The vehicle 1 is stopped on the center line of the passage having the width U, and then is continued to be moved backward until the guide line 28 is in alignment with the front side limit line S1 of the parking space S on the screen of the display 4 as shown in FIG. 19B, and then stopped. This position becomes the initial stopping position P1. Here, as shown in FIG. 19C, a length of the guide line 28 is adjusted to be made to coincide with the passage width by operating the operation switch 13 to thereby measure the passage width U.

Note that, vertical lines may be displayed on both ends of the guide line 28 so that the guide line 28 may be easily made to coincide with the passage width U in a cross direction.

In addition, instead of operating the operation switch 13, similarly to the above-mentioned Embodiment 6, a length of the guide line 28 may also be adjusted in accordance with the steering operation for the steering wheel.

Embodiment 8

In a case where a width of the parking space S is smaller than a general width of 2.5 m, or in a case where the vehicle 1 is to be led to the center of the parking space S having a large width, it is preferable to measure a width of the parking space S after determination of the initial stopping position P1.

Figure 20A:
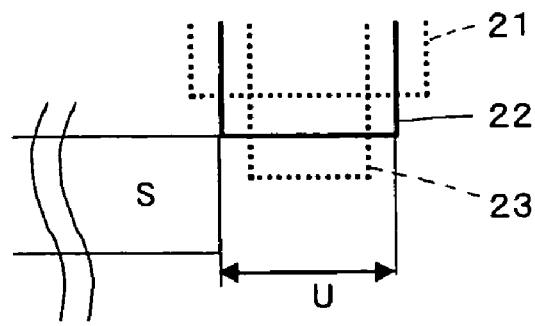
FIGS. 20A and 20B are views stepwise and schematically showing a displayed image on a display when a width of a parking space is determined in Embodiment 8.
Figure 20B:
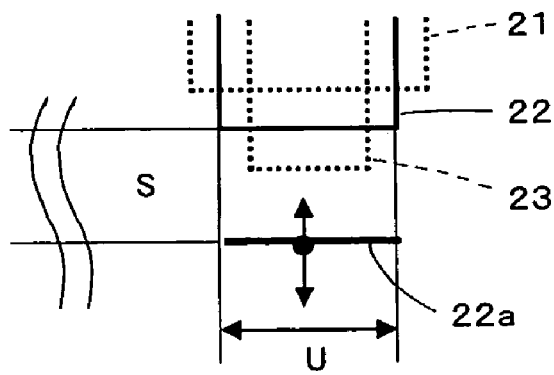

For example, in the above-mentioned Embodiment 1, as shown in FIG. 20A, the vehicle 1 is continued to be moved straight back until a horizontal line of the guide line 22, which is selected in correspondence with the passage width U, is in alignment with the front side limit line S of the parking space S on the screen of the display 4 to determine the initial stopping position P1. Then, as shown in FIG. 20B, the horizontal line 22a of the guide line 22 is vertically moved by operating the operation switch 13 to be made to coincide with the rear side limit line S2 of the parking spaces. Accordingly, a width of the parking space S can be measured.

In consideration of the width of the parking space S thus measured, the controller 8 can calculate a position where the steering operation for the steering wheel 7 should be changed to inform the driver of the guide information.

Embodiment 9

If the vehicle 1 is stopped on the center line of the passage having the width U in the initial stopping position P1, then in the first step, the left side rear wheel of the vehicle 1 comes into contact with the entrance end S0 of the front side limit line of the parking space S, and also the right side front end of the vehicle 1 comes into contact with the edge of the passage.

Figure 21:
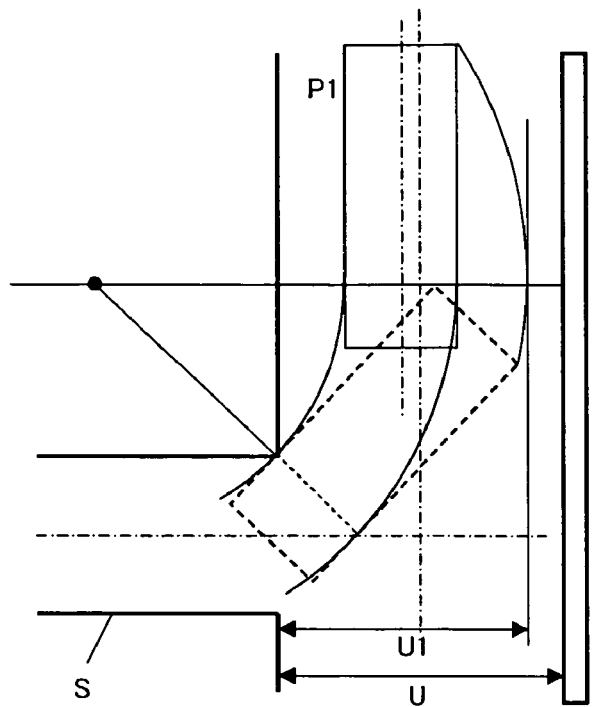
FIG. 21 is a view showing a state in which an initial stopping position is brought close to a side of a parking space in Embodiment 9.

However, as shown in FIG. 21, if the vehicle 1 is brought close to the side of the parking space S in the initial stopping position P1, then in the first step, the left side rear wheel of the vehicle 1 comes into contact with the entrance end S0 of the front side limit line of the parking space S a little early, but the right side front end of the vehicle 1 does not come into contact with the edge of the passage. That is to say, this passage is regarded as a passage having a width U1 narrower than the actual passage width U, resulting in not making full use of the passage width U.

Figure 22:
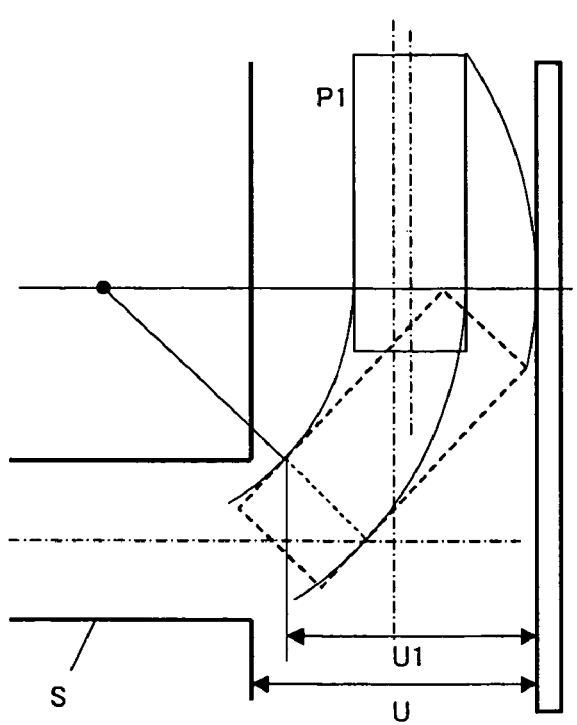
FIG. 22 is a view showing a state in which the initial stopping position is brought close to a side of an edge of a passage in Embodiment 9.

On the other hand, as shown in FIG. 22, if the vehicle 1 is brought close to the edge of the passage in the initial stopping position P1, then the right side front end of the vehicle 1 comes into contact with the edge of the passage a little early. Likewise, this leads to that the passage is regarded as a passage having a width U1 smaller than the actual passage width U. In this case, if the steering wheel 7 is continued to be steered until a predicted locus of the left side rear wheel comes into contact with the entrance end S0 of the front side limit line of the parking space S, then the right side front end of the vehicle 1 will project from the edge of the passage in the first step.

Figure 23:
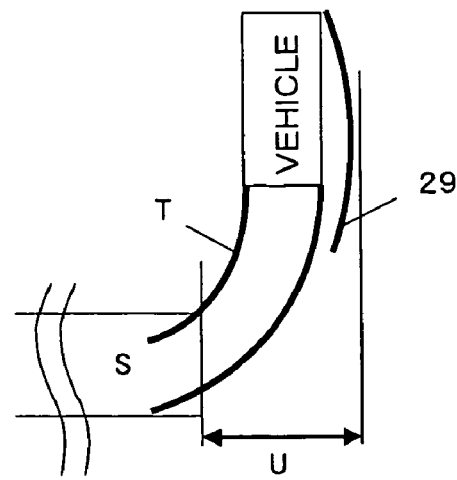
FIG. 23 is a view showing a displayed image on a display in Embodiment 9.

Therefore, it is suitable that as shown in FIG. 23, in the first step, a predicted locus 29 of the right side front end of the vehicle 1 corresponding to a steering angle of the steering wheel 7 is superimposed on the screen of the display 4 so that a steering amount is determined at a position where the predicted locus 29 comes into contact with the edge of the passage.

In actuality, it is preferable that as shown in FIG. 23, predicted loci T of the rear wheels and the predicted locus 29 are simultaneously displayed, and in this state, the steering wheel is steered so that both the predicted loci T and 29 fall within the width of the passage.

In addition, instead of the predicted locus 29, a straight line which contacts the predicted locus 29 and is parallel with the passage may also be superimposed on the screen of the display 4.

Embodiment 10

Figure 24A:
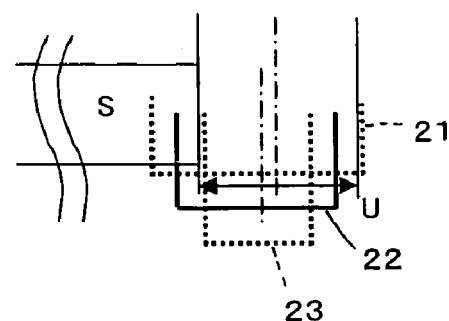
FIGS. 24A and 24B are views stepwise and schematically showing a displayed image on a display in Embodiment 10.
Figure 24B:
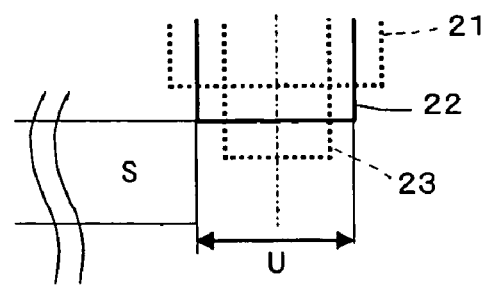

Prior to the in-parallel parking, at a time point or thereabouts when the vehicle 1 is moved forward along the passage to approach the entrance of the parking space S, the in-parallel mode switch 12 may be turned ON to display an image of the rear of the vehicle 1 on the screen of the display 4, and as shown in FIG. 24A, the guide lines 21 to 23 in the above-mentioned Embodiment 1, for example, may be superimposed on the displayed image on the screen of the display 4. Then, as shown in FIG. 24B, the driver steers the steering wheel so that the guide lines 21 to 23 are located at the center of the passage while continuing to move the vehicle forward until a horizontal line of any one of the guide lines 21 to 23 is in alignment with the front side limit line S1 of the parking space S, and then stops the vehicle 1 at a suitable position.

With those operations, it is possible to reduce the position shift of the initial stopping position P1 in a direction of the passage width to thereby enhance the accuracy of the in-parallel parking.

Note that, instead of the guide lines 21 to 23, the oblique lines 24 and 25 in the above-mentioned Embodiment 2, or the guide line 28 in the above-mentioned Embodiment 5 may also be displayed at a time point or thereabouts when the vehicle 1 approaches the entrance of the parking space S.

Embodiment 11

Figure 25A:
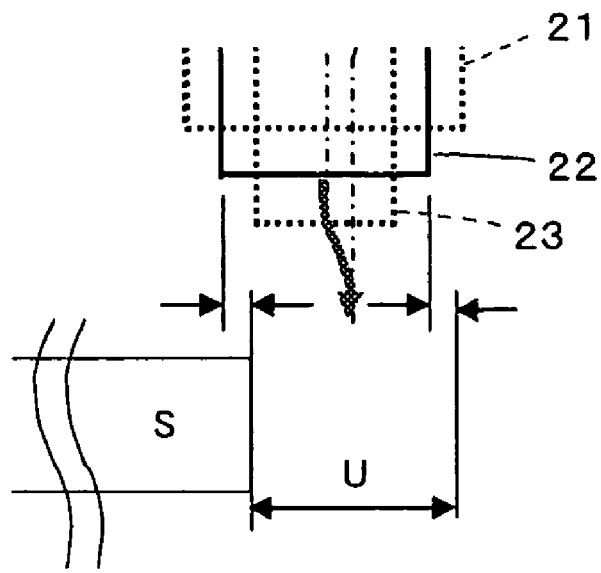
FIGS. 25A and 25B are views stepwise and schematically showing a displayed image on a display in Embodiment 11.
Figure 25B:
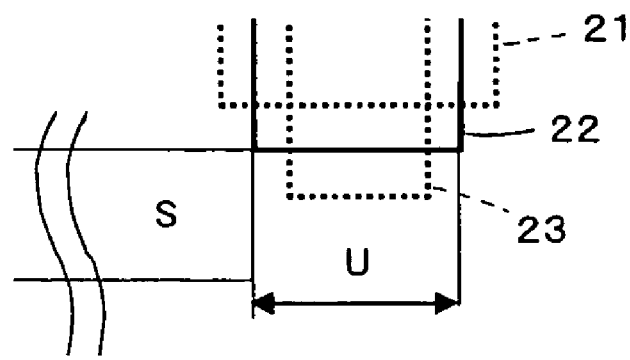

As shown in FIG. 25A, the vehicle 1 may be moved forward and stopped after passing by the parking space S, and for example, the guide lines 21 to 23 in the above-mentioned Embodiment 1 may be superimposed on the screen of the display 4 by turning ON the in-parallel mode switch 12. Upon this operation, visual judgment is made as to which side of the left and right sides with respect to the center of the passage having the width U the vehicle 1 is to be brought closer to, so that distances from the both sides of the passage having the width U become equal to each other to thereby determine a width direction. Then, a horizontal line of the guide line 22 which is selected during the backward movement of the vehicle 1 may be made to coincide with the front side limit line S1 of the parking space S as shown in FIG. 25B, and at the same time, the vehicle 1 may be moved backward so that the guide line 22 comes into contact with the both sides of the passage having the width U.

With those operations, the position shift in a direction of the passage width can be corrected to thereby lead the vehicle 1 to the initial stopping position P1.

Embodiment 12

If the positional relationship between the initial stopping position P1 and the parking space S, and the passage width U are made clear, then a target steering amount in the first step is uniquely determined. Therefore, in the case where the driver steers the steering wheel 7 to start the backward movement of the vehicle 1 so that a predicted locus of the left side rear wheel comes into contact with the entrance end S0 of the front side limit line, and an actual steering amount obtained from the steering angle sensor 10 is deviated from the target value by a predetermined value or more, it is judged that there is abnormality in any one of the passage width U, the initial stopping position P1 and the steering amount which have been already determined, and an alarm can be generated through the speaker 14 to call the driver's attention.

In addition, while in the second step, the full steering operation for the steering wheel 7 corresponds to a target steering amount, even when the vehicle 1 is turned without fully steering the steering wheel 7, an alarm may also be generated.

Embodiment 13

If the positional relationship between the initial stopping position P1 and the parking space S, and the passage width U are made clear, then a position where the steering operation for the steering wheel 7 should be changed is also uniquely determined. That is to say, the number of times of turning required for completion of the in-parallel parking is also determined. Then, at a time point or the like when the turning is started in the first step, the total number of times of turning may also be indicated to the driver via a voice from the speaker 14. As a result, the driver can carry out the in-parallel parking without feeling anxious.

In addition, in each position where the steering operation for the steering wheel 7 should be changed, guide information may also be informed via a voice to the driver of the contents of "fully steer the steering wheel to the right to move the vehicle forward".

Also, determination of whether the steering wheel should be fully steered to the right or left, and determination of whether the vehicle should be moved forward or backward are alternately carried out in the second step. Thus, the driver may be informed of a position where the steering operation for the steering wheel 7 should be changed by flashing of a lamp, instead of the speaker 14.

Embodiment 14

If the positional relationship between the initial stopping position P1 and the parking space S, and the passage width U are made clear, then a target steering amount in the first step, and a position where the steering operation for the steering wheel 7 should be changed in the second step are uniquely determined. Similarly to the above-mentioned Embodiments 1 to 11, the controller 8 informs the driver of the contents which have been uniquely determined. However, in a case where the driving operation proceeds to a next process in a state of being different from the informed contents due to some cause or other, for example, in a case where despite the fact that the driver is informed that the vehicle should be moved backward by a short distance, the driver stops the backward movement of the vehicle since he/she feels uneasy about a collision with an obstacle so that the driving operation proceeds to a next process of forward movement, and so forth, the positional relationship with respect to the vehicle 1 can be grasped on the basis of an output signal from the yaw rate sensor 9. Thus, a subsequent target locus of the vehicle 1 along which the vehicle 1 should be parked into the parking space S from the current position can be calculated again to inform the driver of the resultant target locus.

Note that, when the current position of the vehicle is deviated from the target position so much as to be unable to lead the vehicle 1 to the center of the parking space S, it is preferable to inform the driver that the guidance is impossible at that time point.

Embodiment 15

Figure 26:
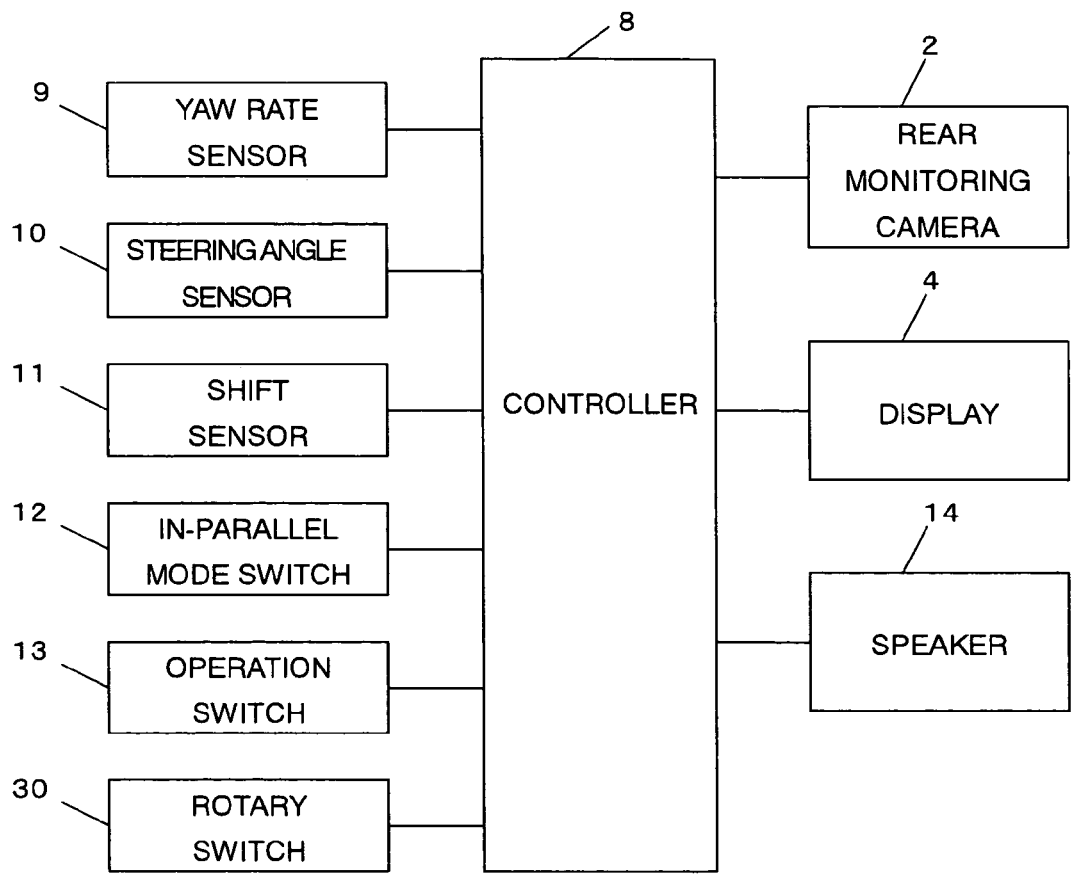
FIG. 26 is a block diagram showing a configuration of a parking assisting device according to Embodiment 15.
Figure 27A:
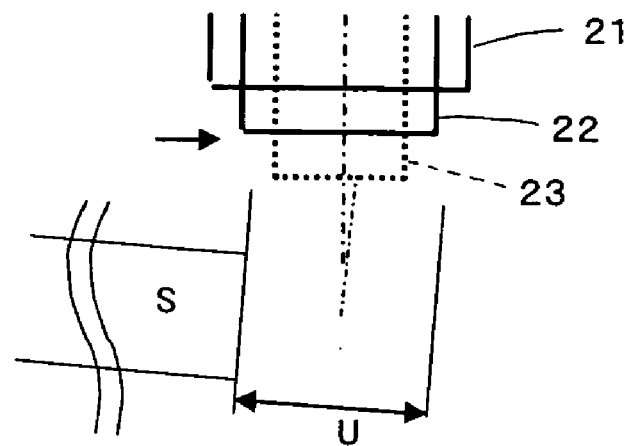
FIGS. 27A and 27B are views stepwise and schematically showing a displayed image on a display in Embodiment 15.
Figure 27B:
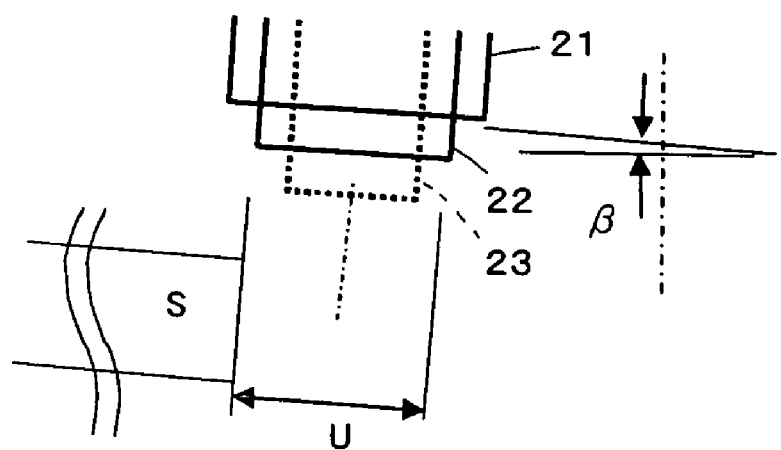

In the above-mentioned Embodiments 1 to 14, as shown in FIG. 26, the parking assisting device may further include a rotary switch 30 for adjusting inclination of the displayed image for guidance on the screen of the display 4. In a case where as shown in FIG. 27A, the guide lines 21 to 23 in the above-mentioned Embodiment 1, for example, which are superimposed on the screen of the display 4 by turning ON the in-parallel mode switch 12 are inclined with respect to an image of the passage, the rotary switch 30 is operated so that as shown in FIG. 27B, the guide lines 21 to 23 are rotated to be made to coincide with the image of the passage. Then, in consideration of an inclination angle β of the guide lines 21 to 23 adjusted at this time, the controller 8 can calculate a position where the steering operation for the steering wheel 7 should be changed to provide the guide information for the driver.

Embodiment 16

Figure 28:
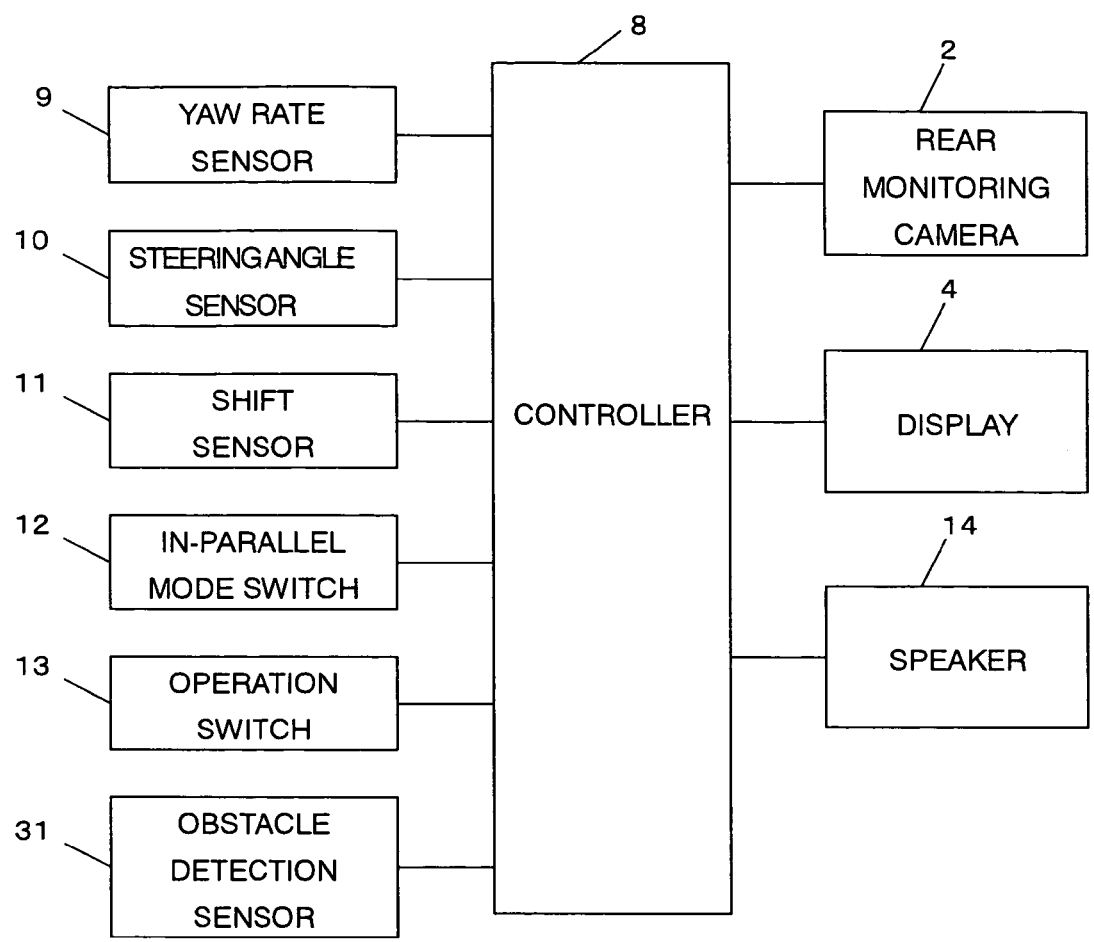
FIG. 28 is a block diagram showing a configuration of a parking assisting device according to Embodiment 16.

In the above-mentioned Embodiments 1 to 15, as shown in FIG. 28, an obstacle detection sensor 31 constituted by an ultrasonic sensor or any other distance measurement sensor may be mounted to the vehicle 1. At this time, when the vehicle approaches another vehicle stopped in the circumference, or a house or a wall located along the edge of the passage, completion of the current process may be detected using a detection signal from the obstacle detection sensor 31.

Embodiment 17

In the above-mentioned Embodiment 1, in the first step, the vehicle 1 is stopped at a time point when the rear wheels of the vehicle 1 have reached the entrance end S0 of the front side limit line of the parking space S, and thereafter, in the second step, the steering wheel 7 is fully steered in the same direction to move the vehicle backward. However, if the conditions permit, in order to simplify the driving operations, even when the rear wheels of the vehicle 1 enter the parking space S, the vehicle 1 may be moved backward while keeping the steering angle as it is without fully steering the steering wheel 7.

Embodiment 18

Figure 29:
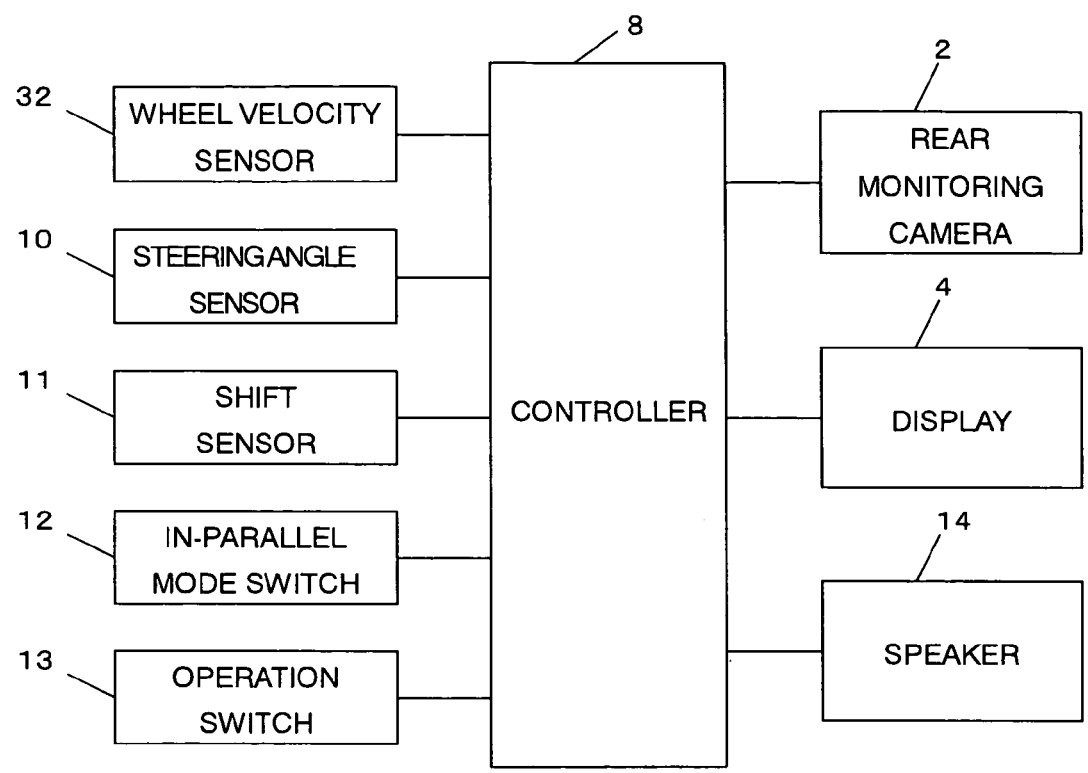
FIG. 29 is a block diagram showing a configuration of a parking assisting device according to Embodiment 18.

In the above-mentioned Embodiment 1, the angular velocity of the vehicle 1 inputted from the yaw rate sensor 9 is integrated to thereby calculate the yaw angle of the vehicle 1. However, as shown in FIG. 29, a wheel velocity sensor 32 may be provided instead of the yaw rate sensor 9. In this case, the yaw angle of the vehicle 1 may be calculated on the basis of a steering angle obtained from the steering angle sensor 10 and a traveling distance obtained from the wheel velocity sensor 32 to provide the guide information for the driver.

In addition, whether or not the in-parallel parking of the vehicle 1 into the parking space S goes well is substantially determined on the basis of the initial stopping position P1 and the first step. Thus, neither the approach information nor arrival information is generated in the second step, but for example, a target line superimposed on the screen of the display 4 may be made to coincide with the limit line of the parking space S, or a state in which the front end of the vehicle 1 approaches the edge of the passage may be visually observed to support the judgment made by the driver in order to lead the vehicle 1 to the parking space S.

It should be noted that while in the above-mentioned Embodiments 1 to 18, the in-parallel parking of the vehicle 1 to the left side of the passage has been described, the in-parallel parking of the vehicle to the right side of the passage can be similarly carried out.

In addition, when an image of the rear of the vehicle captured with the camera 2, predicted loci of the rear wheels, the displayed image for guidance, and the like are displayed on the screen of the display 4, it is desirable to execute processing such as mirror image conversion, camera viewpoint conversion, lens distortion conversion, and the like.

As set forth hereinabove, according to the present invention, the controller calculates the initial stopping position required for the in-parallel parking of the vehicle into the target parking space on the basis of the passage width measured with the passage width measurement unit, and the displayed image for guidance used for guiding the vehicle to the initial stopping position is displayed on the screen of the display. Consequently, the driver can stop the vehicle in the initial stopping position in accordance with the display guidance, and also even in case of a narrow passage, can readily carry out the in-parallel parking by utilizing the parking guide information.

What is claimed is:

1. A parking assisting device comprising:
   a camera for capturing an image behind a vehicle;
   a display provided to a dashboard of the vehicle;
   passage width measurement means for measuring a width of a passage; and
   a controller for displaying the image captured with the camera on the display, and for calculating an initial stopping position required for parking the vehicle in-parallel into a target parking space perpendicular to the passage on the basis of the passage width measured with the passage width measurement means, to superimpose on a screen of the display a displayed image for guidance used for guiding the vehicle to the initial stopping position.

2. A parking assisting device according to claim 1, wherein the initial stopping position is a position corresponding to a steering wheel operation amount which is determined so that a vehicle front end on a side of the passage does not project from the passage width and the outermost end of rear wheels on a side of the parking space passes an entrance end of a parking space limit line.

3. A parking assisting device according to claim 1, wherein the initial stopping position is substantially at a center of the passage width.

4. A parking assisting device according to claim 1, further comprising a steering angle sensor,
   wherein a driver operating a steering wheel to move the vehicle backward so that the vehicle enters an entrance of the parking space from the initial stopping position, carrying out turning operations in which forward movement of the vehicle made by fully steering the steering wheel to one direction and backward movement of the vehicle made by fully steering the steering wheel to the opposite direction are repeated, and moving the vehicle straight back to thereby park the vehicle in-parallel into the parking space.

5. A parking assisting device according to claim 4, further comprising yaw angle detection means for detecting a yaw angle of the vehicle,
   the controller calculating a position where the steering operation for the steering wheel should be changed during parking the vehicle into the parking space from the initial stopping position, and identifying a position of the vehicle from a yaw angle of the vehicle detected with the yaw angle detection means to provide a driver with guide information with respect to the position where the steering operation for the steering wheel should be changed.

6. A parking assisting device according to claim 5, wherein when a rear axle center of the vehicle reaches approximately a center of the parking space, and at the same time, a vehicle direction becomes approximately parallel with the parking space, the controller informs the driver of completion of the turning of the vehicle.

7. A parking assisting device according to claim 5, wherein an operation for the backward movement made by fully steering the steering wheel is carried out at such a turning angle that during the operation for the backward movement or the operation for the next forward movement after changing the steering operation for the steering wheel, a rear axle center of the vehicle reaches approximately a center of the parking space and at the same time a vehicle direction becomes approximately parallel with the parking space, or at such a turning angle that during next forward movement after changing the steering operation for the steering wheel, when a front end of the vehicle reaches an edge of a passage, the rear axle center of the vehicle is located on a side of a front side limit line with respect to the center of the parking space.

8. A parking assisting device according to claim 5, wherein an operation for the forward movement made by fully steering the steering wheel is carried out at such a turning angle that during the operation for the forward movement or the operation for the next backward movement after changing the steering operation for the steering wheel, a rear axle center of the vehicle reaches approximately a center of the parking space and at the same time a vehicle direction becomes approximately parallel with the parking space, or at such a turning angle that during next backward movement after changing the steering operation for the steering wheel, when a rear end of the vehicle reaches a rear side limit line of the parking space, the rear axle center of the vehicle is located on a side of a rear side limit line with respect to the center of the parking space.

9. A parking assisting device according to claim 1, wherein the passage width measurement means measures the passage width using the displayed image for guidance on the display when the vehicle is stopped in the initial stopping position or after the vehicle is stopped in the initial stopping position.

10. A parking assisting device according to claim 4, further comprising parking space width measurement means for measuring a width of the parking space,
    the controller, in consideration of the width of the parking space measured with the parking space width measurement means, calculating a position where the steering operation for the steering wheel should be changed.

11. A parking assisting device according to claim 1, wherein the controller calculates a locus of a front end of the vehicle on a side of the passage corresponding to a steering angle to superimpose on a screen of the display a predicted locus of the front end of the vehicle on the side of the passage or a straight line which contacts the predicted locus of the front end of the vehicle on the side of the passage and which is parallel with the passage.

12. A parking assisting device according to claim 5, further comprising a rotary switch for adjusting inclination of the displayed image for guidance in correspondence to an image on the display,
    the controller, in consideration of an inclination angle of the displayed image for guidance adjusted with the rotary switch, calculating the position where the steering operation for the steering wheel should be changed.

13. A parking assisting device according to claim 5, wherein the controller, on the basis of the position where the steering operation for the steering wheel is actually changed by a driver, calculates again a subsequent position where the steering operation for the steering wheel should be changed to provide the driver with the guide information.

14. A parking assisting device according to claim 4, further comprising an obstacle detection sensor for detecting an obstacle in the circumference surrounding the vehicle,
    the controller providing the driver with the guide information on the basis of a detection signal from the obstacle detection sensor.

15. A parking assisting device according to claim 1, wherein the controller provides the driver with the number of times of steering of a steering wheel required for the vehicle to be parked in-parallel into the parking space from the initial stopping position.

16. A parking assisting device according to claim 1, further comprising a speaker for providing a driver with guide information in the form of a voice.

17. A parking assisting device according to claim 5, wherein the yaw angle detection means is comprised of a yaw rate sensor.

18. A parking assisting device according to claim 5, wherein the yaw angle detection means is comprised of the steering angle sensor and a wheel velocity sensor.

* * * * *

UNITED STATES PATENT AND TRADEMARK OFFICE
CERTIFICATE OF CORRECTION

PATENT NO.         : 7,024,286 B2
APPLICATION NO. : 10/797334
DATED                 : April 4, 2006
INVENTOR(S)       : Tomio Kimura et al.

It is certified that error appears in the above-identified patent and that said Letters Patent is hereby corrected as shown below:

Column 1, line 50, please delete "may a" and insert therefore -- may be a --.

Column 5, line 46, please delete "front side limit line S" and insert therefore -- front side limit line S1 --.

Column 12, line 41, please delete "$(W/2)+(L-A)^2$" and insert therefore -- $(W/2)^2+(L-A)^2$ --.

Column 13, line 43, please delete "= $yc_{2n} - 2R \sin(\alpha_1 + \ldots + \alpha_{2n})$ --" and insert therefore -- = $yc_{2n} + 2R \sin(\alpha_1 + \ldots + \alpha_{2n})$ --.

Signed and Sealed this

Ninth Day of January, 2007

JON W. DUDAS
*Director of the United States Patent and Trademark Office*